US012592237B2

(12) United States Patent
Li et al.

(10) Patent No.: US 12,592,237 B2
(45) Date of Patent: Mar. 31, 2026

(54) DRIVER INTERFACE WITH VOICE AND IMAGE CONTROL

(71) Applicant: SoundHound AI IP, LLC, Santa Clara, CA (US)

(72) Inventors: Zili Li, San Jose, CA (US); Cristina Vasconcelos, Toronto (CA)

(73) Assignee: SoundHound AI IP, LLC, Santa Clara, CA (US)

( * ) Notice: Subject to any disclaimer, the term of this patent is extended or adjusted under 35 U.S.C. 154(b) by 0 days.

(21) Appl. No.: 17/547,917

(22) Filed: Dec. 10, 2021

(65) Prior Publication Data

US 2022/0139393 A1     May 5, 2022

Related U.S. Application Data

(63) Continuation of application No. 16/509,029, filed on Jul. 11, 2019, now Pat. No. 11,257,493.

(51) Int. Cl.
G10L 15/00          (2013.01)
G06F 18/21          (2023.01)
            (Continued)

(52) U.S. Cl.
CPC ............ G10L 15/24 (2013.01); G06F 18/217 (2023.01); G06V 10/764 (2022.01);
            (Continued)

(58) Field of Classification Search
CPC ....... G10L 15/16; G10L 19/00; G10L 19/005; G10L 25/27; G10L 25/30; G10L 15/07;
            (Continued)

(56) References Cited

U.S. PATENT DOCUMENTS 6,366,882 B1     4/2002 Bijl et al.
6,442,820 B1     9/2002 Mason
            (Continued)

FOREIGN PATENT DOCUMENTS

CN          101187990          5/2008
CN          101187990 A          5/2008
            (Continued)

OTHER PUBLICATIONS

Tatsuya Shigetomi, et al., "Location Estimation Method Robust Against Environmental Changes Using Deep Learning," Proceedings of the 22nd Annual Conference of the Virtual Reality Society of Japan, Sep. 2017 (with English language translation of Abstract).
            (Continued)

*Primary Examiner* — Vu B Hang
(74) *Attorney, Agent, or Firm* — Pearl Cohen Zedek Latzer Baratz LLP

(57)          ABSTRACT

A driver interface for use within an automobile provides responses to voice commands issued for example by a driver of the automobile. The interface includes a camera and microphone for capturing image data such as gestures and audio data from the automobile driver. The image data and audio data are processed to extract image and linguistic features from the image and audio data, which image and linguistic features are processed to interpret and infer a meaning of the voice command.

19 Claims, 13 Drawing Sheets

(51) Int. Cl.

| | |
|---|---|
| *G06V 10/70* | (2022.01) |
| *G06V 10/764* | (2022.01) |
| *G06V 10/82* | (2022.01) |
| *G06V 20/40* | (2022.01) |
| *G10L 15/02* | (2006.01) |
| *G10L 15/06* | (2013.01) |
| *G10L 15/16* | (2006.01) |
| *G10L 15/18* | (2013.01) |
| *G10L 15/187* | (2013.01) |
| *G10L 15/22* | (2006.01) |
| *G10L 15/24* | (2013.01) |
| *G10L 15/30* | (2013.01) |
| *G10L 25/30* | (2013.01) |

(52) U.S. Cl.

CPC ............ *G06V 10/768* (2022.01); *G06V 10/82* (2022.01); *G06V 20/46* (2022.01); *G10L 15/02* (2013.01); *G10L 15/063* (2013.01); *G10L 15/16* (2013.01); *G10L 15/1822* (2013.01); *G10L 15/187* (2013.01); *G10L 15/22* (2013.01); *G10L 15/30* (2013.01); *G10L 2015/025* (2013.01); *G10L 2015/223* (2013.01); *G10L 25/30* (2013.01)

(58) Field of Classification Search

CPC ......... G10L 15/20; G10L 15/22; G10L 15/26; G10L 15/30; G10L 15/02; G10L 15/063; G10L 15/12; G10L 15/08; G10L 15/1822; G10L 15/183; G10L 15/193; G10L 15/19

See application file for complete search history.

(56) References Cited

U.S. PATENT DOCUMENTS

| | | | |
|---|---|---|---|
| 6,633,844 | B1 | 10/2003 | Verma et al. |
| 6,964,023 | B2 | 11/2005 | Maes et al. |
| 7,254,538 | B1 | 8/2007 | Hermansky et al. |
| 8,442,820 | B2 | 5/2013 | Kim et al. |
| 8,768,693 | B2 | 7/2014 | Somekh et al. |
| 9,190,058 | B2 | 11/2015 | Klein |
| 9,418,674 | B2 * | 8/2016 | Tzirkel-Hancock ......................... G10L 21/057 |
| 9,514,751 | B2 | 12/2016 | Kim |
| 10,595,072 | B2 * | 3/2020 | Wexler ................. G06V 40/166 |
| 10,614,803 | B2 * | 4/2020 | Xie ......................... G10L 15/02 |
| 11,257,493 | B2 * | 2/2022 | Vasconcelos ......... G06F 18/217 |
| 11,290,518 | B2 * | 3/2022 | Kim ......................... G06F 3/013 |
| 2002/0135618 | A1 | 9/2002 | Maes et al. |
| 2003/0018475 | A1 | 1/2003 | Basu et al. |
| 2003/0130840 | A1 | 7/2003 | Forand |
| 2009/0060351 | A1 | 3/2009 | Li et al. |
| 2010/0106486 | A1 | 4/2010 | Hua et al. |
| 2011/0071830 | A1 | 3/2011 | Kim et al. |
| 2011/0119053 | A1 | 5/2011 | Kuo et al. |
| 2011/0161076 | A1 | 6/2011 | Davis et al. |
| 2012/0265528 | A1 | 10/2012 | Gruber et al. |
| 2013/0311184 | A1 | 11/2013 | Badavne et al. |
| 2014/0112556 | A1 * | 4/2014 | Kalinli-Akbacak ......................... G06V 40/176 382/128 |
| 2014/0214424 | A1 | 7/2014 | Wang et al. |
| 2015/0161995 | A1 | 6/2015 | Sainath et al. |
| 2015/0199960 | A1 | 7/2015 | Huo et al. |
| 2015/0205568 | A1 | 7/2015 | Matsuoka |
| 2015/0235641 | A1 | 8/2015 | Vanblon et al. |
| 2015/0340034 | A1 | 11/2015 | Schalkwyk et al. |
| 2016/0034811 | A1 | 2/2016 | Paulik et al. |
| 2017/0061966 | A1 | 3/2017 | Marcheret et al. |
| 2017/0186044 | A1 * | 6/2017 | Tal-Israel ................. G06F 16/70 |
| 2017/0186432 | A1 | 6/2017 | Aleksic et al. |
| 2017/0236516 | A1 | 8/2017 | Lane |
| 2018/0075849 | A1 | 3/2018 | Khoury et al. |
| 2019/0130200 | A1 * | 5/2019 | Stent ....................... G06V 10/80 |
| 2021/0065712 | A1 | 3/2021 | Holm |

FOREIGN PATENT DOCUMENTS

| | | |
|---|---|---|
| CN | 104463250 | 3/2015 |
| CN | 104463250 A | 3/2015 |
| CN | 105760852 | 7/2016 |
| CN | 106782545 | 5/2017 |
| CN | 107945789 | 4/2018 |
| CN | 109147763 | 1/2019 |
| CN | 109697976 | 4/2019 |
| CN | 110111783 | 8/2019 |
| CN | 110136698 | 8/2019 |
| CN | 107507612 | 8/2020 |
| CN | 107507612 B | 8/2020 |
| JP | 2002268683 | 9/2002 |
| JP | 2002268683 A | 9/2002 |
| JP | 2003241788 | 8/2003 |
| JP | 2003271182 | 9/2003 |
| JP | 2003271182 A | 9/2003 |
| JP | 2004260641 | 9/2004 |
| JP | 2004260641 A | 9/2004 |
| JP | 2004333738 | 11/2004 |
| JP | 2005128307 | 5/2005 |
| JP | 2005128307 A | 5/2005 |
| JP | 2007027990 | 2/2007 |
| JP | 2007027990 A | 2/2007 |
| JP | 2012022053 | 2/2012 |
| JP | 2012242609 | 12/2012 |
| JP | 2015088099 | 5/2015 |
| JP | 2015088099 A | 5/2015 |
| JP | 2015175859 | 10/2015 |
| JP | 2016143050 | 8/2016 |
| JP | 2016170701 | 9/2016 |
| JP | 2017090612 | 5/2017 |
| JP | 2017090612 A | 5/2017 |
| JP | 2019097016 | 6/2019 |
| JP | 2019097016 A | 6/2019 |
| JP | 2019102081 | 6/2019 |
| JP | 2019102081 A | 6/2019 |
| JP | 2019128732 | 8/2019 |
| JP | 2019128732 A | 8/2019 |
| KR | 20030077012 A | 9/2003 |
| KR | 20090055426 | 6/2009 |
| KR | 20090055426 A | 6/2009 |
| KR | 20180111197 | 10/2018 |
| KR | 20180111197 A | 10/2018 |
| KR | 20180126353 | 11/2018 |
| TW | 201140558 | 11/2011 |
| WO | 2011111221 | 9/2011 |
| WO | 2011111221 A1 | 9/2011 |
| WO | 2014199596 | 2/2017 |
| WO | 2017135148 | 11/2018 |
| WO | 2019159364 | 5/2020 |

OTHER PUBLICATIONS

English language Abstract of JP2004333738 published Nov. 25, 2004.

English language Abstract of JP2012022053 published Feb. 2, 2012.

English language Abstract of JP2003241788 published Aug. 29, 2003.

English language Abstract for JP2019097016 published Jun. 20, 2019.

English language Abstract for JP2003271182 published Sep. 25, 2003.

English language Abstract for WO2011111221 published Sep. 15, 2011.

English language Abstract for JP2002268683 published Sep. 20, 2002.

Somada, "For face recognition that is robust against aging Research on collation methods", master's thesis for the Department of Information Engineering, Graduate School of Engineering, Mie University, Mar. 2018.

(56) References Cited

OTHER PUBLICATIONS

Dave Sullivan, GM's Super Cruise Is a Marriage of Culling-Edge Hardware and Software, Forbes, Oct. 23, 2017.

Mtank, Multi-Modal Methods: Visual Speech Recognition (Lip Reading), Medium.com, May 3, 2018.

Sri Garimella, et al., Robust i-vector based adaptation of DNN acoustic model for speech recognition. Sixteenth Annual Conference of the International Speech Communication Association, Sep. 6-10, 2015.

David Snyder, et al., Spoken Language Recognition using X-vectors. InOdyssey Jun. 2018 (pp. 105-111).

Najim Dehak, et al., Front-end factor analysis for speaker verification. IEEE Transactions on Audio, Speech, and Language Processing. Aug. 9, 2010; 19(4):788-98.

Yannis M. Assael, et al., Lipnet: End-to-end sentence-level lipreading. arXiv preprint arXiv: 1611.01599. Nov. 6, 2016.

Nvidia, Nvidia Drive IX, developer.nvidia.com, Jun. 5, 2019.

Jesus F. Guitartr Perez, et al., Lip reading for robust speech recognition on embedded devices. InProceedings. ICASSP'05). IEEE International Conference on Acoustics, Speech, and Signal Processing, 2005. Mar. 23, 2005 (vol. 1, pp. 1-473). IEEE.

Triantafyllos Afouras, et al., Deep audio-visual speech recognition. IEEE transactions on pattern analysis and machine intelligence. Dec. 21, 2018.

Brendan Shillingford et al., Large-Scale Visual Speech Recognition, 1807.05162v3 [cs.CV] Oct. 1, 2018, DeepMind and Google.

Shinichi Hara, et al., Speaker-Adaptive Speech Recognition using Facial Image Identification, IEICE Technical Report, SP2012-55 (Jul. 2012), School of Engineering, Soka University, Tokyo, Japan.

Moriya et al., "Multimodal Speaker Adaptation of Acoustic Model and Language Model for ASR Using Speaker Face Embedding." ICASSP 2019-2019 IEEE International Conference on Acoustics, Speech and Signal Processing (ICASSP), May 12-17, 2019. IEEE (Year: 2019).

English language Abstract for CN107507612 published Aug. 28, 2020.

English language Abstract for JP2004260641 published Sep. 16, 2004.

English language Abstract for JP2017090612 published May 25, 2017.

English language Abstract for JP2019102081 published Jun. 24, 2019.

English language Abstract for JP2019128732 published Aug. 1, 2019.

English language Abstract for JP2005128307 published May 19, 2005.

English language Abstract for JP2007027990 published Feb. 1, 2007.

English language Abstract for JP2015088099 published May 7, 2015.

Ciprian Chelba, et al., Sparse non-negative matrix language modeling for geo-annotated query session data. In2015 IEEE Workshop on Automatic Speech Recognition and Understanding (ASRU) Dec. 13, 2015 (pp. 8-14). IEEE.

Oriol Vinyals, et al., Show and tell: A neural image caption generator. InProceedings of the IEEE conference on computer vision and pattern recognition 2015 (pp. 3156-3164).

Yusuf Aytar, et al., Soundnet: Learning sound representations from unlabeled video. InAdvances in neural information processing systems 2016 (pp. 892-900).

Joon Son Chung, et al., Lip reading sentences in the wild. In2017 IEEE Conference on Computer Vision and Pattern Recognition (CVPR) Jul. 21, 2017 (pp. 3444-3453). IEEE.

Hans-Gunter Hirsch, et al., The Aurora experimental framework for the performance evaluation of speech recognition systems under noisy conditions. InASR2000-Automatic Speech Recognition: Challenges for the new Millenium ISCA Tutorial and Research Workshop (ITRW) 2000.

Wikipedia, tf-idf, Jul. 9, 2019.

Michael Johnston, et al., MATCH: An architecture for multimodal dialogue systems. InProceedings of the 40th Annual Meeting on Association for Computational Linguistics Jul. 6, 2002 (pp. 376-383). Association for Computational Linguistics.

X. Chen, et al., Recurrent neural network language model adaptation for multi-genre broadcast speech recognition. InSixteenth Annual Conference of the International Speech Communication Association 2015.

Tomas Mikolov, et al., Context dependent recurrent neural network language model. In2012 IEEE Spoken Language Technology Workshop (SLT) Dec. 2, 2012 (pp. 234-239). IEEE.

Cong Duy Vu Hoang, et al., Incorporating side information into recurrent neural network language models. InProceedings of the 2016 Conference of the North American Chapter of the Association for Computational Linguistics: Human Language Technologies Jun. 2016 (pp. 1250-1255).

Yi Luan, et al., LSTM based conversation models. arXiv preprint arXiv:1603.09457. Mar. 31, 2016.

Shalini Ghosh, et al., Contextual lstm (clstm) models for large scale nlp tasks. arXiv preprint arXiv:1602.06291. Feb. 19, 2016.

Aaron Jaech, et al., Low-rank RNN adaptation for context-aware language modeling. Transactions of the Association for Computational Linguistics. Jul. 2018;6:497-510.

English language Abstract for CN101187990 published May 28, 2018.

English language Abstract for CN104463250 published Mar. 25, 2015.

English language Abstract for KR20180111197 published Oct. 11, 2018.

English language Abstract for KR20090055426 published Jun. 2, 2009.

Office Action dated Sep. 2, 2021 in U.S. Appl. No. 16/509,029.

Response to Office Action filed Sep. 2, 2021 in U.S. Appl. No. 16/509,029.

Notice of Allowance dated Dec. 17, 2021 in U.S. Appl. No. 16/509,029.

Amendment Under 37 C.F.R. 1.312 dated Oct. 20, 2021 in U.S. Appl. No. 16/509,029.

English language Abstract of KR20180126363 published Nov. 27, 2018.

Aaron Jaech, et al., "Low-rank RNN_ adaptation for context-aware language modeling", Transactions of the Association for Computational Linguistics, Jul. 1, 2018; 6:497-510.

Vahid Asadpour et al., "Audio-visual speaker identification uing dynamic facial movements and utterance phonetic content." Applied Soft Computing 11, No. 2, Jul. 13, 2010; 2083-2093.

Chao, et al., "Deep Speaker Embedding for Speaker-Targeted Automatic Speech Recognition", Proceedings of the 2019 3rd International Conference on Natural Language Processing and Information Retrieval—NLPIR 2019, Jun. 28-30, 2019. doi:10.1145/3342827.3342847.

Ciprian Chelba et al., "Multinomial Loss on Held-Out Data for the Sparse Non-negative Matrix Language Model", Feb. 22, 2016.

Cong Duy, et al., "Incorporating Side Information into Recurrent Neural Network Language Models", In Proceedings of the 2016 Conference of the North American Chapter of the Association for Computational Linguistics Human anguage Technologies, Jun. 12-17, 2016 (pp. 1250-1255).

Dave Sullivan, "GM's Super Cruise Is a Marriage of Cutting-Edge Hardware and Software", Forbes, Oct. 23, 2017.

David Snyder, et al., "Spoken Language Recognition using X-vectors", InOdyssey Jun. 26, 2018 (pp. 105-111).

David Pearce, et al., "The Aurora experimental framework for the performance evaluation of the speech recognition systems under noisy conditions", In ASR2000-Automatic Speech Recognition: Challenges for the new Millenium ISCA Tutorial and Research Workshop (ITRW) 2000. ICSLP 2000 (6th International Conference on Spoken Language Processing); Oct. 16-20, 2000.

Jesus F. Guitartr Perez, et al., "Lip Reading for Robust Speech Recognition on Embedded Devices", InProceedings.(ICASSP'05). IEEE International Conference on Acoustics, Speech, and Signal Processing, 2005. Mar. 23, 2005 (vol. 1, pp. 1-473).

(56) References Cited

OTHER PUBLICATIONS

Darsh J Shah et al., "Robust Zero-Shot Cross-Domain Slot Filling with Example Values", arXiv:1906.06870v1, Jun. 17, 2019.

Yasufumi Moriya et al., "Multimodal Speaker Adaptation of Acoustic Model and Language Model for ASR Using Speaker Face Embedding." ICASSP 2019-2019 IEEE International Conference on Acoustics, Speech and Signal Processing (ICASSP). IEEE May 12-17, 2019 (Year: 2019).

Michael Johnston, et al., MATCH: An architecture for Multimodal Dialogue Systems, In Proceedings of the 40th Annual Meeting on Association for Computational Linguistics Jul. 6, 2002 (pp. 376-383).

Nvidia, Nvidia Drive IX, developer.nvidia.com, 2019.

Oriol Vinyals, et al., "Show and Tell: A Neural Image Caption Generator", In Proceedings of the IEEE Conference on Computer vision and pattern recognition, Jun. 7-12, 2015 (pp. 3156-3164).

Shalini Ghosh, et al., "Contextual LSTM (CLSTM) models for Large scale NLP tasks", arXiv: 1602.06291v2. May 31, 2016.

Brendan Shillingford, et al. "Large-scale visual speech recognition." arXiv:1807.05162v3 Oct. 1, 2018.

Daniel R. Flynn, "Multi-Modal Methods: Recent Interactions Between Computer Vision and Natural Language Processing", The M Tank, Jul. 2, 2018.

Tomas Mikolov, et al., "Context Dependent Recurrent Neural Network Language Model", In 2012 IEEE Spoken Language Technology Workshop (SLT) Dec. 2012 (pp. 234-239); Microsoft Research Technical Report, Jul. 27, 2012.

Triantafyllos Afouras, et al., "Deep Audio-Visual Speech Recognition", IEEE transactions on pattern analysis and machine intelligence. Dec. 2018.

K. Chen, et al., "Recurrent Neural Network Language Model Adaptation for Multi-Genre Broadcast Speech Recognition", Sixteenth Annual Conference of the International Speech Communication Association, Sep. 6-10, 2015.

Yajie Miao et al., "Improvements to Speaker Adaptive Training of Deep Neural Networks", Language Technologies Institute, School of Computer Science, Carnegie Mellon University, © 2014 IEEE Spoken Language Technology Workshop (SLT) Dec. 7-10, 2014.

Yannis M. Assael, et al., "Lipnet: End-to-End Sentence-Level Lipreading", arXiv:1611.01599v2, Dec. 16, 2016.

Yi Luan, et al., "LSTM based Conversation Models", arXiv: 1603.09457v1. Mar. 31, 2016.

Yusuf Aytar, et al., "Soundnet: Learning Sound Representations from Unlabeled Video", In Advances in neural information processing systems 2016 (pp. 892-900); 30th Conference on Neural Information Processing Systems (NIPS 2016), Dec. 5-10, 2016.

Yuta Soda, "Master's Thesis—Resarch on collation methods for face recognition that is robust against secular variation", Master's Program in Information Engineering, Graduate School of Engineering, Mie University, 2017.

Jesus F. Guitartr Perez, et al., Lip reading for robust speech recognition on embedded devices. InProceedings. ICASSP'05). IEEE International Conference on Acoustics, Speech, and Signal Processing, 2005. Mar. 2, 20053 (vol. 1, pp. 1-473). IEEE.

Joon Son Chung, et al., Lip reading sentences in the wild. In2017 IEEE Conference on Computer Vision and Pattern Recognition (CVPR) Jul. 2, 20171 (pp. 3444-3453). IEEE.

Michael Johnston, et al., MATCH: An architecture for multimodal dialogue systems. InProceedings of the 40th Annual Meeting on Association for Computational Linguistics Jul. 6, 2002 (pp. 376-383). Association for Computational inguistics.

Yi Luan, et al., LSTM based conversation models. arXiv preprint arXiv:1603.09457. Mar. 3, 20161.

Response to Office Action dated Sep. 2, 2021 in U.S. Appl. No. 16/509,029.

Notice of Allowance and Fees Due dated Oct. 4, 2021 in U.S. Appl. No. 16/509,029.

Amendment Under 37 C.F.R. 1.1312 dated Oct. 20, 2021 in U.S. Appl. No. 16/509,029.

Feng et al., "Audio Visual Speech Recognition with Multimodal Recurrent Neural Networks", IEEE, 2017 International Joint Conference on Neural Networks (IJCNN), May 14-19, 2017.

English language Abstract for WO2017135148 published Nov. 29, 2018.

Masayoshi Yoshikawa et al., Multimodal Speech Recognition Based on Lightweight Visual Features, IEICE, Aug. 2012, vol. J95-D, No. 3, p. 618-627.

English language Abstract for CN106782545 published May 31, 2017.

English language Abstract for CN107945789 published Apr. 20, 2018.

English language Abstract for CN109147763 published Jan. 4, 2019.

English language Abstract for CN109697976 published Apr. 30, 2019.

English language Abstract for CN110111783 published Aug. 9, 2019.

English language Abstract for CN110136698 published Aug. 16, 2019.

English language Abstract for JP2012242609 published Dec. 10, 2012.

English language Abstract for TW201140558 published Nov. 16, 2011.

English language Abstract for WO2014199596 published Feb. 3, 2017.

Campr et al., "Online Speaker Adaptation of an Acoustic Model using Face Recognition", International Conference on Text, Speech and Dialogue, Sep. 2013.

* cited by examiner 300
325
310
330
315          305          320
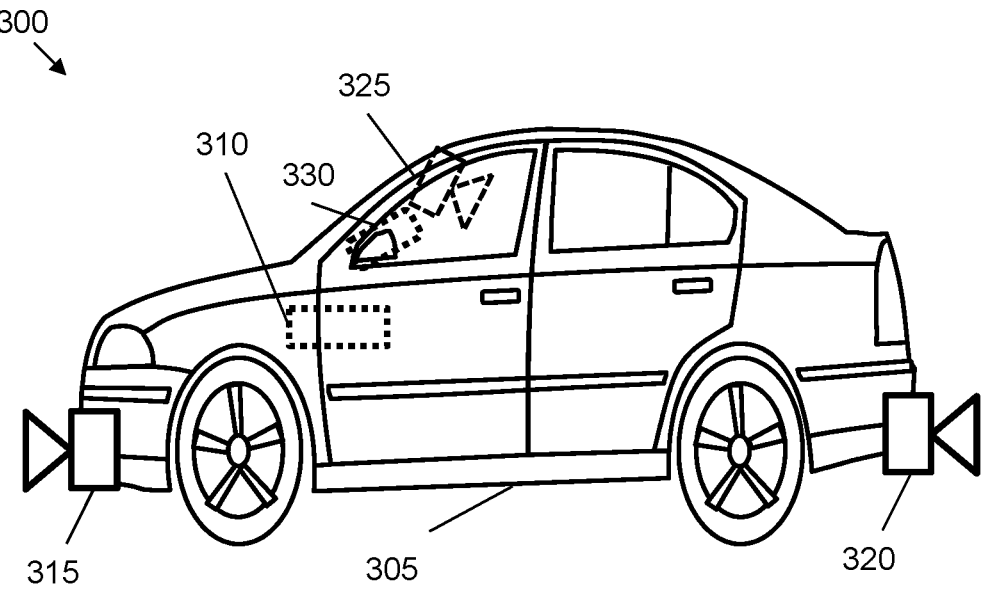
FIG. 3A
370          365
375
360
390
395
380
355
355
350
FIG. 3B
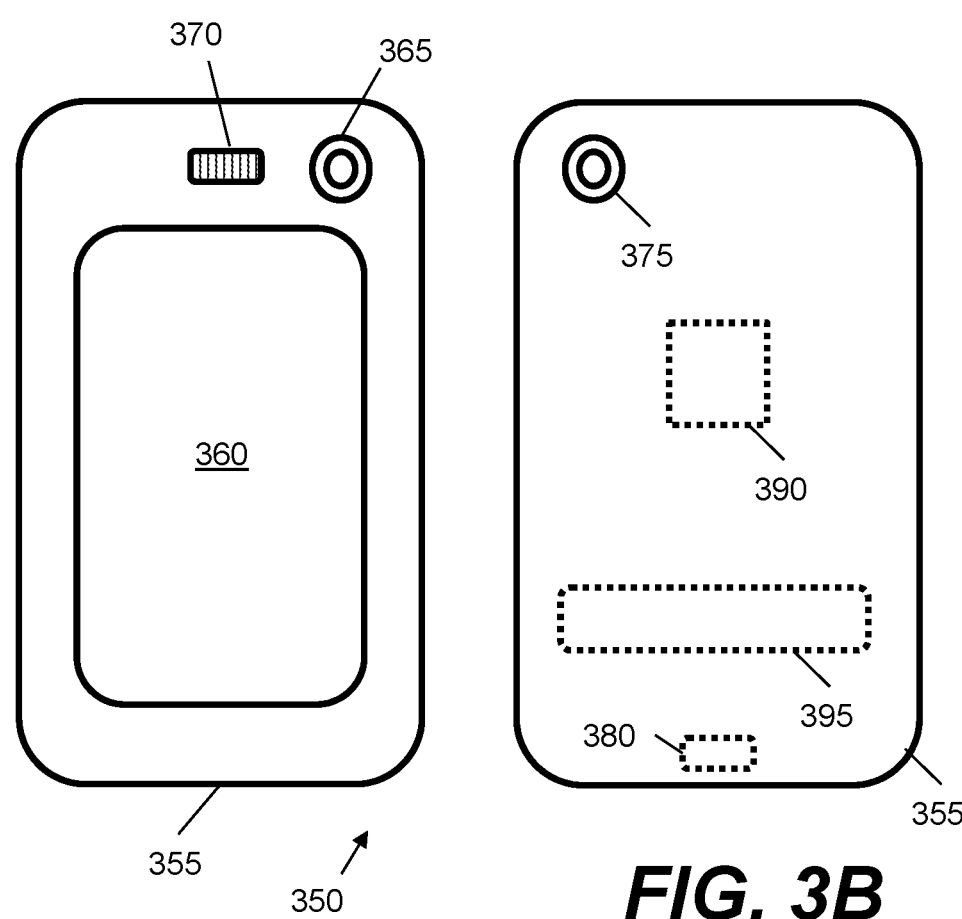

440

1000

1010 — Couple Feature Extractors to Linguistic Model

1020 — Obtain Training Data

1030 — Jointly Configure

1100

1110  Computer processors

1120  Graphics processors 1130  interconnect

1140  RAM

1150  Network interface

DRIVER INTERFACE WITH VOICE AND IMAGE CONTROL

CLAIM OF PRIORITY

The present application is a continuation of U.S. patent application Ser. No. 16/509,029, filed on Jul. 11, 2019, entitled "VISION-ASSISTED SPEECH PROCESSING," which application is incorporated by reference herein in its entirety.

FIELD OF THE INVENTION

The present technology is in the field of speech processing.

BACKGROUND

Recent advances in computing have raised the possibility of realizing many long sought-after voice-control applications. For example, improvements in statistical models, including practical frameworks for effective neural network architectures, have greatly increased the accuracy and reliability of previous speech processing systems. This has been coupled with a rise in wide area computer networks, which offer a range of modular services that can be simply accessed using application programming interfaces. Voice is thus quickly becoming a viable option for providing a user interface.

As speech is a natural mode of human communication, voice control offers many benefits over traditional user interfaces, such as a keyboard and mouse, or, more recently, a capacitive touch screen. Controlling a device using speech enables users to multitask, such as safely operating a motor vehicle or heavy machinery, or cooking a meal. Voice control devices have thus become popular in the home, where they are often used to ask questions, play music and set reminders. Voice control is also an active research area in automotive systems design.

Despite these advances, users often report that current systems lack human-level responsiveness and intelligence. Translating pressure fluctuations in the air into parsed commands is incredibly difficult. Speech processing typically involves a complex processing pipeline, where errors at any stage can derail a successful machine interpretation. Many of these challenges are not immediately apparent to human beings, who are able to process speech using cortical and sub-cortical structures without conscious thought. Engineers working in the field, however, quickly become aware of the gap between human ability and state of the art machine processing.

Certain patent publications have described systems for working with images.

U.S. Pat. No. 8,768,693 B2 describes a system and method for assigning one or more tags to an image file. An image file may include an audio component embedded therein to be converted into a textual tag that is associated with the image file as additional metadata.

US 2009/0060351 A1 describes systems and methods for visual language modeling for image classification. The systems and methods model training images corresponding to multiple image categories as matrices of "visual words".

It is desired to provide speech processing systems and methods that are able to more accurately transcribe and parse human utterances. It is further desired to provide speech processing methods that may be practically implemented with real world devices. For example, most users do not have access to supercomputer or data center processing resources, desiring low-cost devices that may be easily embedded in everyday objects. Motor vehicles further present challenges for system integration and connectivity.

SUMMARY OF THE INVENTION

Certain examples described herein provide methods and systems for processing speech. Certain examples use both audio data and image data to process speech. Certain examples respectively extract audio features and visual features from audio data and image data. The features may be provided as feature tensors, e.g., numeric arrays that represent salient aspects of the data. Certain examples provide a client-server architecture whereby audio features and visual features are extracted at a client device and transmitted to a server device for further processing. The audio features and visual features are supplied to a linguistic model, e.g., that is implemented at the server device. The linguistic model is used to parse an utterance associated with the audio data. Use of both audio features and image features improves an accuracy of the linguistic model used to parse the utterance. The processing framework is also able to be implemented within a range of real-world devices, from low-cost embedded voice assistants to in-vehicle voice control systems.

In one aspect, a client device for processing speech is provided. The client device comprises an audio capture device to capture audio data featuring an utterance from a user and an image capture device to capture frames of image data, the image data featuring an environment of the user. A visual feature extractor receives the frames of image data from the image capture device to generate one or more visual feature tensors. The visual feature tensors have an information content that is less than the frames of image data, e.g., provide a compressed representation of the frames of image data. An audio feature extractor receives the audio data from the audio capture device to generate one or more audio feature tensors. A transmitter of the client device is used to transmit the visual feature tensors and the audio feature tensors to a server device, wherein the server device is configured to supply at least the visual feature tensors and the audio feature tensors to a linguistic model, the linguistic model being configured to determine linguistic features that are usable to parse the utterance. In this aspect, the visual feature extractor and the audio feature extractor are jointly configured with the linguistic model.

According to the above aspect, a client device is able to generate informationally rich representations of an environment where an utterance, such as a voice command, from a user is recorded. Due to the joint configuration, the visual feature tensor generates an output that represents visual features of the environment of the utterance in a manner that reduces a parsing error for the utterance. The visual feature tensor may be seen as a compressed representation of visual features that are useful in disambiguating audio input.

According to another aspect, a server device for processing speech is provided. The server device comprises a receiver to receive one or more visual feature tensors and one or more audio feature tensors from a client device. The client device may be the client device of the above aspect. The visual feature tensors are generated by a visual feature extractor of the client device based on frames of image data captured by the client device, the frames of image data featuring an environment of the client device and having an information content that is greater than the visual feature tensors, e.g., the visual feature tensors provide a compressed representation of the frames of image data. The audio feature tensors are generated by an audio feature extractor of the client device based on corresponding audio data captured by the client device following an utterance of a user. The server device further comprises a linguistic model to receive the visual feature tensors and the audio feature tensors and to determine linguistic features that are usable to parse the utterance, wherein the linguistic model is jointly configured with the visual feature extractor and the audio feature extractor of the client device.

By generating audio and visual feature tensors at the client device, a data size of information used to parse the utterance that is transmitted to a server device may be reduced. By using a client-server model configured in this manner, processing at the client device may be reduced, enabling a greater diversity of client implementations, including a range of embedded devices, such as in vehicles, home appliances or wearable devices.

In one variation, one or more of the visual feature extractor and the audio feature extractor comprise a neural network architecture, for example, one or more of a convolutional neural network and a recurrent neural network. In one case, the visual feature extractor may comprise a convolutional neural network and the audio feature extractor may comprise a recurrent neural network. In these cases, joint configuration may comprise joint training of the neural networks. This provides a mechanism to perform joint configuration in an end-to-end manner, e.g., given a suitable set of training data. This variation allows recent advances in neural network architectures in both sound and vision to be modularly implemented within a speech processing pipeline.

In one variation, visual feature tensors comprise a numeric representation of a visual context for the environment. In this case, the transmitter of the client device is configured to transmit the audio data to the server device with the audio feature tensors and the linguistic model of the server device is configured, using the audio and visual feature tensors, to determine linguistic features based on the audio data. In this variation, the audio data may comprise time series samples or frequency features as per a legacy speech processing pipeline. The visual feature tensors and/or the audio feature tensors may be used as an enhancement of the legacy speech processing pipeline. These tensors may provide numeric representations of an environment of an utterance that are informative for the linguistic model of the speech processing pipeline, e.g., that provide additional information in a compressed form that improves predictions of the linguistic model, such as predictions of phonemes and/or transcribed text.

In one variation, the image data comprises video data, and the audio data is temporally correlated with the video data. In this variation, the visual feature extractor and the audio feature extractor are applied in parallel to the video data and the audio data. In this manner, examples may take advantage of multi-core central and/or graphical processing units (CPUs and/or GPUs), which are increasingly used in even low-cost embedded devices, to provide rapid responses to utterances, e.g., human-like responsiveness to voice commands.

In one variation, the visual feature extractor comprises a first convolutional neural network architecture comprising a plurality of layers including a first input layer to receive a frame of image data and a first output layer, wherein the first convolutional neural network architecture is parameterized using a set of trained parameters for each of the plurality of layers, the set of trained parameters being derived from a training operation with one or more additional classification layers coupled to the first output layer. In this variation, the visual feature extractor also comprises a second neural network architecture comprising one or more layers including a second input layer and a second output layer, the second input layer being coupled to the first output layer of the first convolutional neural network architecture, and the second output layer having a dimensionality that is less than the dimensionality of the first output layer. This variation allows the visual feature extractor to be constructed from pretrained convolutional neural networks (e.g., "off-the-shelf" systems) to ensure relevance and stability of visual feature training, yet allow the second neural network architecture to implement an information bottleneck to learn visual features that are relevant for audio processing.

In the above variation, the second neural network architecture may be jointly trained with the audio feature extractor and the linguistic model in a training operation, wherein the set of trained parameters for the first convolutional neural network architecture may be fixed during the training operation. In this manner, the parameters of pretrained convolutional neural networks may be fixed to avoid so-called catastrophic forgetting, i.e. where parameter values representing a manifold of low error are lost as training moves away from the manifold.

In one variation, an attention pre-processor is used to apply a weighting to the audio and visual feature tensors prior to use by the linguistic model. Use of an attention pre-processor may act to weight certain elements of the visual and/or audio feature tensors based on learnt experience. This may improve performance, e.g., reduce error rates and improve training. In one case, this may involve introducing "prior" terms to weight certain features.

In one variation, the linguistic model comprises a neural network architecture that receives the audio and visual feature tensors as an input and that outputs a text representation of the utterance. The neural network architecture may be a recurrent neural network architecture. In this variation, text useable to parse the utterance may be generated by the linguistic model, and the linguistic model may be jointly trained based on a dataset of video with audio and transcribed text (e.g., subtitles). The variation may thus leverage large online datasets to reduce a parsing error when processing speech.

In one variation, the audio feature tensors comprise a representation of an audio context for the environment and the visual feature tensors comprise a representation of a visual context for the environment. In this variation, the receiver of the server device is configured to receive the audio data in addition to the audio feature tensors, and the linguistic model comprises an acoustic model to generate phoneme data for use in parsing the utterance from the audio data, the acoustic model being configured based on the audio and visual feature tensors. In this variation, an acoustic model, e.g., a model that transcribes sequences of phonemes from time and/or frequency data, may be improved by supplying the visual and audio feature tensors as a representation of a context of an environment. For example, this variation may enable non-neural statistical models, e.g., that use probabilities and/or n-gram sequences, to be improved. The context of the environment is able to aid the acoustic model to disambiguate correct sequences of phonemes in challenging audio environments, such as within rain or on public transport.

In one variation, the acoustic model comprises: a database of acoustic model configurations; an acoustic model selector to select an acoustic model configuration from the database based on a joint set of the audio and visual feature tensors;

and an acoustic model instance to process the audio data, the acoustic model instance being instantiated based on the acoustic model configuration selected by the acoustic model selector, the acoustic model instance being configured to generate the phoneme data for use in parsing the utterance. In this variation, the audio and visual feature tensors may comprise low dimensionality representations, e.g., having outputs of a few bits, that are used to select an appropriate acoustic model for an environment. This variation may be efficiently implemented and reduce additional data that is transmitted from the client device to the server device. This variation may also be robust when used with real-world data, e.g., constraining the architecture reduces training problems and the possibility of complex error modes.

In one variation, the linguistic model further comprises: a language model communicatively coupled to the acoustic model to receive the phoneme data and to generate text data representing the utterance. In this variation, the language model may be configured to receive the audio feature tensors and the visual feature tensors as an input for use in generating the text data representing the utterance. This variation thus provides a two-tier or two-stage linguistic model, which may be more reliable than a direct feature-to-text implementation under certain conditions.

In one aspect, a method for processing speech at a client device is provided. The method may be performed in association with the above client device aspect. The method comprises capturing, at the client device, audio data featuring an utterance from a user; capturing, at the client device, image data featuring an environment of the user; extracting, using a visual feature extractor at the client device, a set of visual feature tensors from one or more frames of the image data, the frames of image data having an information content that is greater than the set of visual feature tensors, e.g., the visual feature tensors provide a compressed representation of the frames of image data; extracting, using an audio feature extractor at the client device, a set of audio feature tensors from the audio data; and transmitting, at the client device, the set of audio and visual feature tensors to a server device, the server device being configured to supply at least the visual feature tensors and the audio feature tensors to a linguistic model, the linguistic model being configured to determine a set of linguistic features that are usable to parse the utterance, wherein the visual feature extractor and the audio feature extractor are jointly configured with the linguistic model.

In one aspect, a method for processing speech at a server device is provided. The method comprises: receiving, at the server device, a set of audio and visual feature tensors from a client device, the visual feature tensors being generated by a visual feature extractor of the client device based on frames of image data captured by the client device, the frames of image data featuring an environment of the client device and having an information content that is greater than the visual feature tensors, e.g., the visual feature tensors provide a compressed representation of the frames of image data. The audio feature tensors are generated by an audio feature extractor of the client device based on corresponding audio data captured by the client device following an utterance of a user. The method then further comprises providing, at the server device, the set of audio and visual feature tensors as input to a linguistic model, the linguistic model being configured to determine a set of linguistic features that are usable to parse the utterance, wherein the visual feature extractor and the audio feature extractor are jointly configured with the linguistic model; and parsing the utterance using the output of the linguistic model. The method may be performed as a server-side method in response to the client-side operations described in the aspect above.

The methods of both aspects may provide advantages similar to those described for the device aspects above.

In one variation, the server-side method comprises: selecting, at the server device, an acoustic model configuration based on the received set of audio and visual feature tensors; receiving, at the server device, the audio data; applying an acoustic model configured according to the acoustic model configuration to the audio data to determine phoneme data corresponding to the utterance; and parsing the utterance using the phoneme data. For example, this variation may allow a robust two-tier model as described above.

In one variation, the client-side method comprises: receiving, at the client device, a response to the utterance from the server device; and providing, at the client device, a response to the user based on the response to the utterance received from the server device. For example, the utterance may comprise a voice command such as a query and the response may comprise a query response that is dictated to the user. In another case, the utterance may comprise speech and the response may comprise an indication of dictation of the speech. In yet another case, the utterance may comprise a voice command to control a device and the response may comprise an indication of a state of the device following execution of the voice command.

In one variation, the client-side method comprises: providing data derived from the captured image data to a first convolutional neural network architecture comprising a plurality of layers including a first input layer to receive a frame of image data and a first output layer; and providing an output of the first output layer to a second neural network architecture comprising one or more layers including a second output layer, the second output layer having a dimensionality that is less than the dimensionality of the first output layer, the output of the second output layer being used to generate the set of visual feature tensors. This variation may have advantages as described above.

In one aspect, there is a method of configuring a system for processing speech. In this aspect, the method comprises: communicatively coupling an audio feature extractor and a visual feature extractor to a linguistic model to obtain a speech recognition model, the audio feature extractor being configured to receive audio data and to output an audio feature tensor, the visual feature extractor being configured to receive image data and to output a visual feature tensor, the linguistic model being configured to use the audio and visual feature tensors to determine a set of linguistic features, the audio and visual feature extractors and the linguistic model being parameterized by respective sets of model parameters; obtaining training data comprising temporally-correlated audio and image data and ground-truth linguistic features; and jointly configuring the audio and visual feature extractors and the linguistic model using the training data to determine trained values for the respective sets of model parameters, including back propagating an error of the linguistic model through the speech recognition model.

The above aspect may provide an efficient method to train the previously-described client and server devices. Jointly configuring the audio and visual feature extractors and the linguistic model allows an error in a prediction by the linguistic model to "flow" through the linguistic model to the audio and visual feature extractors, so as to modify the parameters of these extractors in a manner that leads to output features that minimize the error. Hence, the audio and visual feature extractors learn feature representations that improve a performance of the linguistic model. End-to-end training in this manner may be easy to configure and implement as part of an automated pipeline.

In one variation, the method comprises: communicating the trained values for the audio and visual feature extractors to one or more client devices; communicating the trained values for the linguistic model to one or more server devices; and configuring the one or more client devices and the one or more server devices using the trained values, wherein the one or more client devices are configured to load the trained values for use in generating audio and visual feature tensors that are processed by the one or more server devices. In this manner, joint configuration may be performed at a central location with parameters that are then delivered to a plurality of devices in a distributed system.

In one variation, one or more of the audio and visual feature tensors that are used by the linguistic model may be weighted during training. Values for one of the feature tensors may be reduced in magnitude to improve robustness, e.g., such that the linguistic model is able to parse the utterance, even if one or more of audio and visual feature tensors are unavailable. This may allow the linguistic model to "fallback" to an audio only mode if visual feature tensors are not available.

In one variation, the method comprises obtaining a trained visual classification model; removing one or more classification layers of the configured visual classification model to generate a new output layer for the trained visual classification model; and communicatively coupling a further neural network architecture comprising one or more layers to the new output layer to obtain the visual feature extractor, the dimensionality of the output of the further neural network architecture being smaller than the dimensionality of the new output layer. This may allow the use of pretrained models and the advantages this brings, e.g., as discussed above.

In one aspect, there is non-transitory computer readable medium storing code comprising instructions that, if executed by a computer processor would cause a machine to implement one or more of the method aspects described above.

In one aspect, there is a speech processing apparatus comprising an acoustic model to generate phoneme data for use in parsing speech data; a language model to generate a transcription of the speech data using the phoneme data from the acoustic model; and a visual context indicator, communicatively coupled to at least one of the acoustic model and the language model, to provide a representation of a visual environment in which the speech data is captured, wherein one of the acoustic model and the language model are differentially configured based on the representation of the visual environment.

BRIEF DESCRIPTION OF THE DRAWINGS

FIG. 3A is a schematic illustration showing a motor vehicle that comprises speech processing equipment according to an example.

FIG. 3B is a schematic illustration showing a mobile computing device that comprises speech processing equipment according to an example.

DETAILED DESCRIPTION

The following describes various examples of the present technology that illustrate various interesting aspects. Generally, examples can use the described aspects in any combination.

Certain examples described herein use visual information to improve speech processing. These examples make use of the proliferation of image capture devices within our environment to encode a representation of the environment that may be used within speech processing pipelines. As such, these examples may be seen to extend speech processing systems with multi-modal capabilities that improve the accuracy and reliability of audio processing.

Certain examples described herein provide a practical client-server implementation that allows improvements to be realized in a large variety of devices, including embedded speech processing devices such as voice assistants, mobile telephones, motor vehicles, and wearable devices. These examples provide a framework for processing multimodal data that reduces an amount of data that is exchanged over a network, yet that allows for advanced speech processing methods to be applied.

Certain examples of the present technology have advantages over U.S. Pat. No. 8,768,693 B2 and US 2009/0060351 A1 in providing systems and methods for speech processing systems. U.S. Pat. No. 8,768,693 B2 is concerned with converting audio data into text to tag an image and does not use audio data and image data to improve speech processing. US 2009/0060351 A1 is concerned with image classification. It teaches to divides an image into patches, where features for these patches are known as "visual words". These "visual words" may be seen as a form of hash code as opposed to a linguistic feature. The "visual words" are used to categorize the image. US 2009/0060351 A1 provides no useful teaching for speech processing.

Client-Server Architecture

Figure 1:
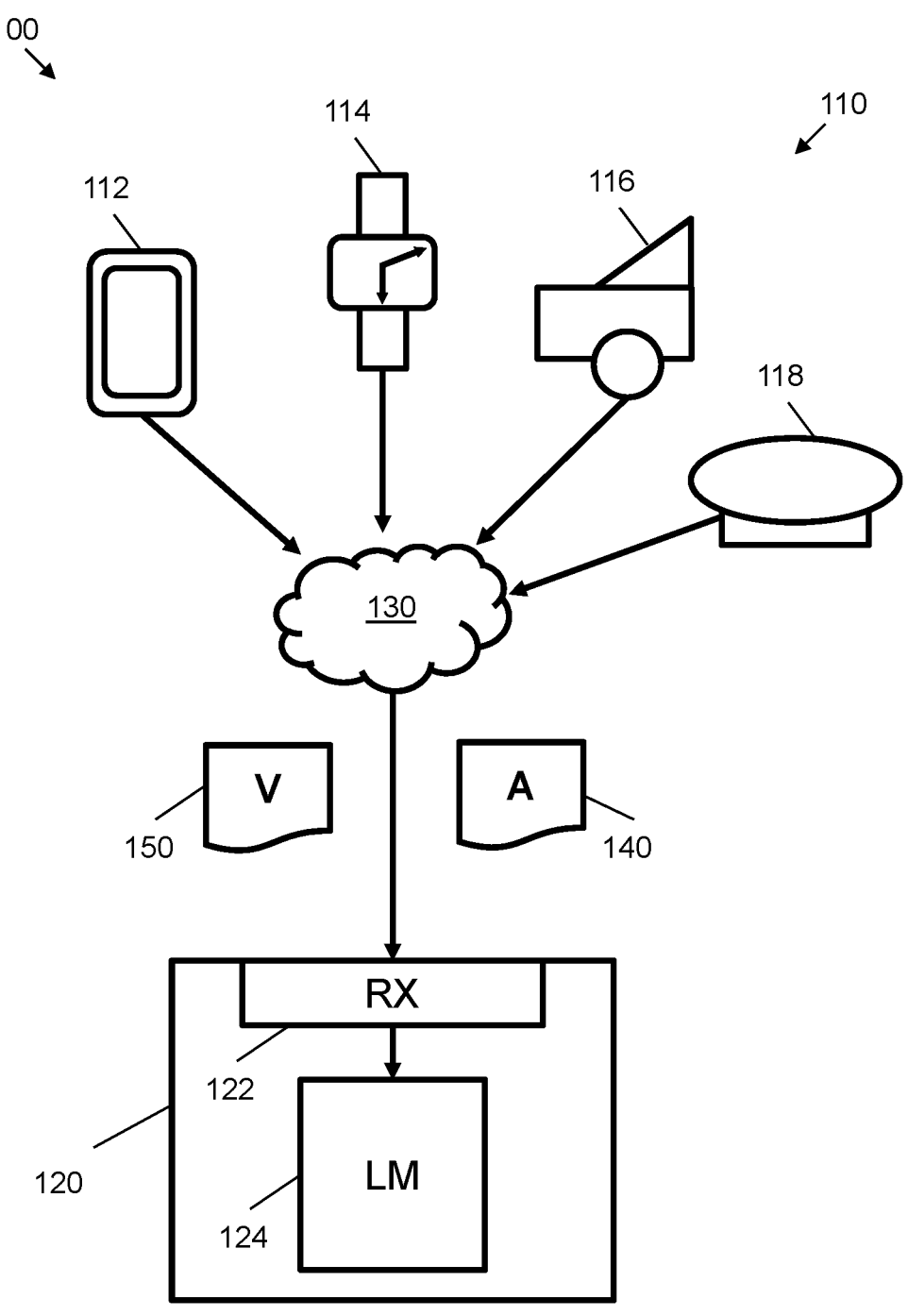
FIG. 1 is a schematic illustration showing a speech processing system according to an example.

FIG. 1 shows a client-server architecture 100 according to an example. The client-server architecture 100 comprises a plurality of client devices 110 that communicate with a server device 120 over at least one network 130. The network 130 may comprise one or more local and/or wide area networks that may be implemented using a variety of physical technologies (e.g., wired technologies such as Ethernet and/or wireless technologies such as Wi-Fi—IEEE 802.11—standards and cellular communications technologies). In certain cases, the network 130 may comprise a mixture of one or more private and public networks such as the Internet. The client devices 110 and the server device 120 may communicate over the network using different technologies and communication pathways.

The client devices 110 may comprise a range of computing devices including embedded computing devices, e.g., processing resources within electronic circuitry that are located within a non-computing device. In FIG. 1, the client devices 110 comprise, as examples, a personal computing device 112, a wearable device 114, a motor vehicle 116 and a home assistant 118. These examples are not limiting; e.g., client devices may alternatively comprise "smart" appliances such as refrigerators and televisions, security equipment, desktop and office computing devices, cameras and robotic devices. The personal computing device 112 may comprise a cellular communications device and/or a wireless networking device. The personal computing device 112 may comprise a smartphone, tablet, or laptop device. The wearable device 114 in FIG. 1 is shown as a so-called "smart" watch but may alternatively comprise devices such as head-mounted user interface devices, earpieces, wearable fitness trackers, and "smart" clothing with embedded circuitry. The motor vehicle 116 is shown as a car, e.g., a client device may be embedded within a vehicle control system, but other vehicle types and forms may be used, e.g., aerial and nautical vehicles. Vehicles may be manually controlled and/or have autonomous functions (e.g., aerial "drones"). The home assistant 118 may comprise an audio device for use in the home. Further characteristics of example client devices are described in more detail in later sections.

The server device 120 may comprise a computing device with one or more central processing units and/or graphical processing units and a memory resource. In FIG. 1 the server device 120 comprises a receiver 122 and a linguistic model 124. The receiver 122 may comprise a communications interface and implementations of one or more communications protocols (e.g., in a multi-layer communications stack). The receiver 122 is configured to receive data from the client devices 110 over the network 130. In one implementation, the receiver 122 may comprise a wired or wireless physical interface and one or more communications protocols that provide methods for receiving requests in a predefined format. In one case, the receiver 122 may comprise an application layer interface operating on top of an Internet Protocol Suite. In this case, the application layer interface may be configured to receive communications directed towards a particular Internet Protocol address identifying the server device 120, with routing based on path names or web addresses being performed by one or more proxies and/or communication (e.g., "web") servers.

The server device 120 in FIG. 1 is configured to receive data from one or more of the client devices 110 that relates to an utterance issued by a user (e.g., a user of the client devices 110). An utterance in this context is associated with a vocal sound produced by a user that represents linguistic information such as speech. For example, an utterance may comprise speech that emanates from a user's larynx. The utterance may comprise a voice command, e.g., a spoken request from a user. The voice command may comprise, for example: a request to perform an action (e.g., "Play music", "Turn on heating", "Set a reminder"); further information relating to a request (e.g., "Album XY", "68 degrees Fahrenheit", "Tuesday at 9 am"); speech to be transcribed (e.g., "Take a note . . . " or "Send the following message to user A . . . "); and/or a request for information (e.g., "What is the traffic like on C?", "What is the weather like today?", or "Where is the best vegan taco?"). The user may be a human being or a machine (e.g., the latter may represent machine-to-machine communication using artificial speech).

In the example of FIG. 1, the client devices 110 are arranged to capture audio data featuring an utterance from a user. In one case, the audio data may be captured by the client device itself; in another case, another device may capture the audio data. For example, a user operating wearable device 114 may speak towards the wearable device 114 or into a room containing home assistant 118 or another audio capture device. The audio data may comprise time series measurements from one or more audio capture devices (e.g., one or more microphones). For example, one or more channels of Pulse Code Modulation (PCM) data may be captured at a predefined sampling rate (e.g., 8 kHz or 44.1 kHz), where each sample is represented by a predefined number of bits (e.g., 8, 16 or 24 bits per sample—where each sample comprise an integer or float value). Audio data may be processed following capture, e.g., by filtering in one or more of the time and frequency domains, by applying beam forming and noise reduction, and/or by filtering and normalization. In one case, audio data may be converted into measurements over time in the frequency domain, e.g., by performing the Fast Fourier Transform to create one or more frames of spectrogram data. In certain cases, filter banks may be applied to determine values for one or more frequency domain features, such as Mel-Frequency Cepstral Coefficients. Audio data as described herein may comprise any measurement made along an audio processing pipeline.

In the example of FIG. 1, the captured audio data is transformed into a set of audio features 140 that are transmitted from at least one of the client devices 110 across the network to the receiver 122 of the server device 120. These audio features 140 may comprise an audio feature tensor, e.g., an array having one or more dimensions with one or more elements. In one case, an audio feature tensor may comprise a fixed length one-dimensional array (e.g., a vector) or numeric values, e.g., one value for each element of the array. The numeric values may comprise integer values (e.g., within a range set by a particular bit length—8 bits giving a range of 0 to 255) or floating-point values (e.g., defined as 32-bit or 64-bit floating point values). Floating-point values may be used if normalization is applied to the audio feature tensor, e.g., if values are mapped to a range of 0 to 1 or −1 to 1. The size, e.g., in bits or bytes, of the audio feature tensor may be smaller than a size of the raw captured audio data, in certain cases of orders of magnitude smaller. As such, the information content of the audio feature tensor, e.g., as represented by data size and/or number of data elements, is less that the information content of the audio data. For example, 1 second of audio data with 16-bit samples at 44.1 kHz may result in data with a size of 88200 bytes, whereas 256 elements of 32-bit floating point values may result in data with a size of 1024 bytes (8 bit integer values have an even smaller size of 256 bytes). This may also be seen as providing a compressed representation, e.g., as the size of the visual feature tensor is less than the size of the corresponding frame or frames of image data used as input. In general, the visual feature tensor is still highly informative, e.g., for subsequent speech processing; the size is reduced by discarding information that is not relevant for the speech processing, which acts as a form of lossy compression.

In a similar manner to the audio data, in the example of FIG. 1, the client devices 110 are also arranged to capture image data featuring an environment of the client device. In one case, the image data may be captured by the client device itself; in another case, another device may capture the image data. For example, the wearable device 114 may comprise a camera and the image data may comprise an image captured from the camera. In another case, the user may be interacting with the wearable device 114 and the capture of audio data may trigger the capture of image data from another image capture device within the environment. For example, a user may have a home surveillance system comprising one or more Internet Protocol cameras; in this case, when a user issues a voice command to the wearable device 114, the wearable device 114 may instruct the capture of a frame of image data from the one or more Internet Protocol cameras that cover an identified location of the user. In one case, the client device 110 may comprise a video capture device, wherein the image data comprises one or more frames of video data, and/or a static image capture device, wherein the image data comprises one or more frames of static images. The image data may comprise, for example, a two-dimensional array having a height and a width (e.g., equivalent to rows and columns of the array). In one case, the image data may have multiple color channels, e.g., comprise three color channels for each of the colors Red Green Blue (RGB), where each color channel has an associated two-dimensional array of color values (e.g., at 8, 16 or 24 bits per array element). Color channels may also be referred to as different image "planes". In certain cases, only a single channel may be used, e.g., representing a lightness channel. Different color spaces may be used depending on the application, e.g., an image capture device may natively generate frames of YUV image data featuring a lightness channel Y (e.g., luminance) and two opponent color channels U and V (e.g., two chrominance components roughly aligned blue-green and red-green). As with the audio data, the frames of image data may be processed following capture, e.g., one or more image filtering operations may be applied.

In the example of FIG. 1, the captured image data is also transformed into a set of visual features 150 that are transmitted from at least one of the client devices 110 across the network to the receiver 122 of the server device 120. These visual features 150 may comprise a visual feature tensor, e.g., an array having one or more dimensions with one or more elements. In one case, a visual feature tensor may comprise a fixed length one-dimensional array (e.g., a vector) or numeric values, e.g., one value for each element of the array. The numeric values may comprise integer values (e.g., within a range set by a particular bit length—8 bits giving a range of 0 to 255) or floating-point values (e.g., defined as 32-bit or 64-bit floating point values). Floating-point values may be used if normalization is applied to the visual feature tensor, e.g., if values are mapped to a range of 0 to 1 or −1 to 1. The visual feature tensor may be of the same size as the audio feature tensor or may be of a different size. For example, the audio feature tensor may comprise a 32-element array, where each element is an 8-bit value, and the visual feature tensor may comprise a 256-element array, where each element is an 8 or 16-bit value. In general, a visual feature tensor has an information content that is less than a corresponding frame of image data, e.g., using the aforementioned example, a visual feature tensor of length 256 with 8-bit values is smaller than a 640 by 480 video frame having 3 channels of 8-bit values—2048 bits vs 7372800 bits. Information content may be measured in bits or in the form of an entropy measurement.

In the example of FIG. 1, the linguistic model 124 receives the audio features 140 and the visual features 150 from the receiver 122 and uses these to parse the user's utterance. In one case, the linguistic model 124 is configured to determine a set of linguistic features that are useable to parse the utterance. The linguistic model may also be referred to as a speech processing module. For example, the linguistic features may comprise phonemes, word portions (e.g., stems or proto-words), and words (including text features such as pauses that are mapped to punctuation). In one case, the linguistic features may be used to generate a text output that represents the utterance. In this case, the text output may be used as-is or may be mapped to a predefined set of commands and/or command data. In another case, the linguistic features may be directly mapped to the predefined set of commands and/or command data. The linguistic model 124 may operate based on the audio features 140 and the visual features 150 alone, or may operate based on these and additional audio data, e.g., audio data representing an output of an audio processing pipeline at the client device prior to the generation of the audio features 140.

The use of visual features 150 in addition to audio features 140 may improve the performance of the linguistic model 124. The visual features 150 may provide a visual context for the utterance that differs from an audio context represented by the audio features 140. For example, a set of visual features 140 may provide a representation that indicates a user is within a motor vehicle or a representation that indicates a user is outside in a park. When there are a plurality of candidate phoneme sequences that are ranked as possible by the linguistic model 124 (e.g., that have a probability greater than a threshold), in a "motor vehicle" case, the linguistic model 124 may select a phoneme sequence that is consistent with the presence of ambient road and vehicle noise, whereas in the "outside" case the linguistic model 124 may select a phoneme sequence that is consistent with the presence of wind noise. In each case, a different phoneme sequence may be selected based on the visual features 150. As another example, the phoneme sequence "AY S K R IY M" may be mapped to "ice cream" text (or a knowledge base object representation of "ice cream") in a case where the set of visual features 150 represent a light outside environment, a supermarket or an ice cream cone, but mapped to "I scream" text (or a knowledge base object representation of the user and a "scream" action) where the set of visual features 150 represent a dark or murky environment like a garage or shed or an animal such as a spider.

In examples described herein, relevant audio and/or visual features 140, 150 may be generated by jointly configuring visual feature extractors and audio feature extractors with the linguistic model 124. For example, the linguistic model 124 may be jointly trained with a set of visual and audio feature extractors and/or may share parameters with the extractors. Further details of possible joint configurations are described later below.

Example Client Device

Figure 2:
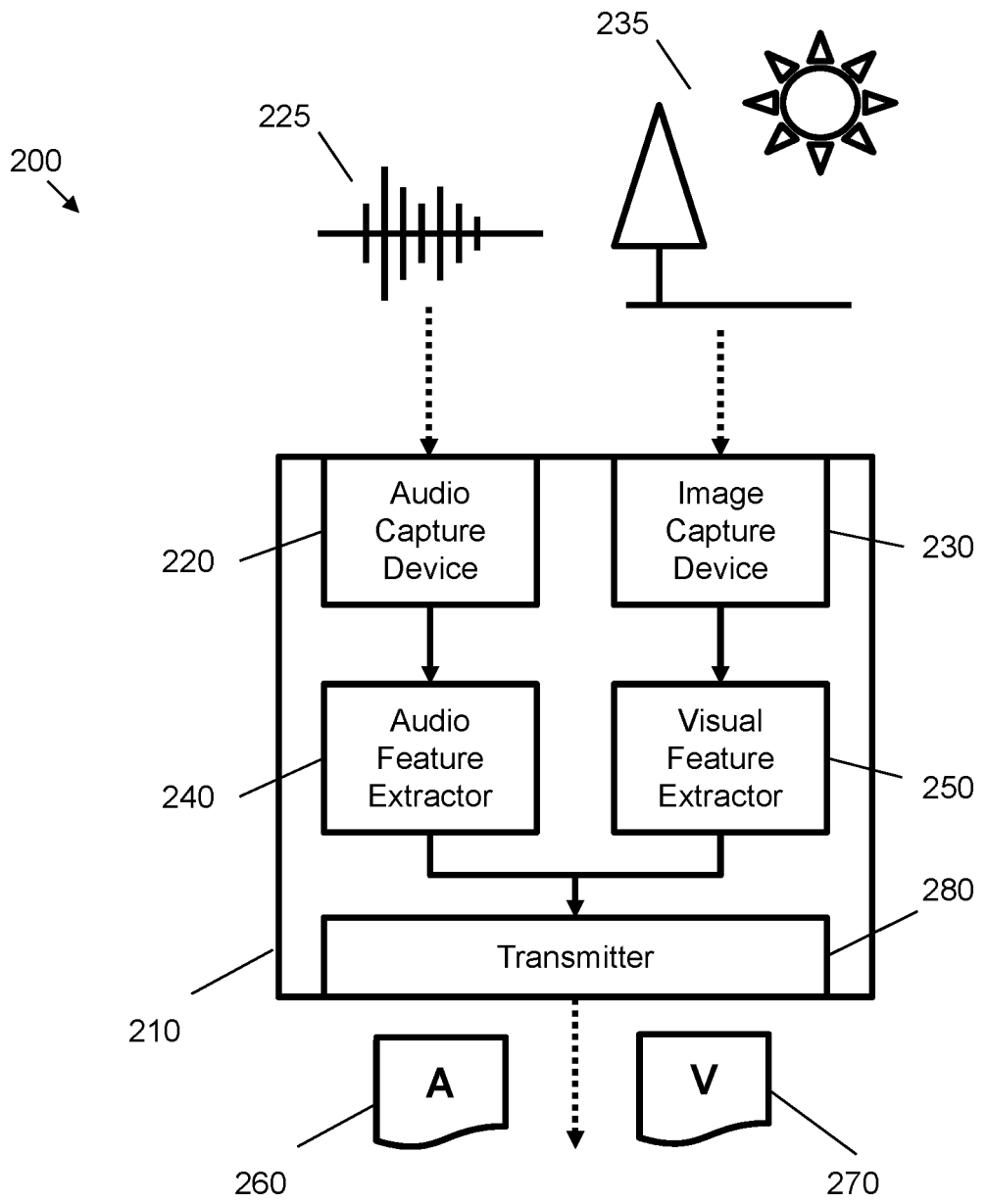
FIG. 2 is a schematic illustration showing a client device for speech processing according to an example.

FIG. 2 shows an example 200 of a client device 210. Client device 210 may comprise a version of one of the client devices 110 shown in FIG. 1. It should be noted that the client device 210 only shows certain features that are relevant to the present description; the client device 210 may include additional features that are not shown here for clarity of explanation. For example, client devices may be screenless, such as an earpiece, which has no display screen. Some client devices may be stationary, such as a vending machine. Some client devices may be mobile, such as an automobile or a robotic device. Some client devices may be portable, such as a mobile phone. Some client devices may comprise manual interfaces such as keyboard or touch screens. Moreover, the client device 210 provides one possible arrangement of components, wherein other arrangements, e.g., on a distributed basis, are also possible.

The client device 210 of FIG. 2 comprises an audio capture device 220 and an image capture device 230. The audio capture device 220 is configured to capture audio data representing sounds 225 from an environment external to the client device 210. As described above, the audio capture device 220 may comprise a microphone or array of microphones that are configured to record audio samples at a predefined sampling rate. In certain cases, aspects of the audio capture device 220, such as the sampling rate, bit resolution, number of channels and sample format may be configurable. The audio data may be Pulse Code Modulated. The audio capture device 220 may also include audio pre-processing and/or filtering components (e.g., contrast adjustment, noise removal, etc.). The components and methods described herein are able to accommodate a wide variety of audio formats due to the joint configuration stage.

The image capture device 230 is configured to capture frames of image data featuring the visual environment 235 external to the client device 210. As described above, the image capture device 230 may comprise one or more still or video cameras that are configured to capture frames of image data on command or at a predefined sampling rate. In one case, a predefined sampling rate may be less than a frame rate for full resolution video, e.g., a video stream may be captured at 30 frames per second, but a sampling rate of the image capture device may capture at this rate, or at a lower rate such as 1 frame per second. In the examples, one or more frames of image data (e.g., in total or per second) may be enough to capture a state of a visual environment 235 for use in further speech processing. The image capture device 230 may capture one or more frames of image data having one or more color channels (e.g., RGB or YUV as described above). In certain cases, aspects of the image capture device 230, such as the frame rate, frame size and resolution, number of color channels and sample format may be configurable. The frames of image data may be downsampled in certain cases, e.g., video capture device that captures video at a "4K" resolution of 3840×2160 may be downsampled to 640×480 or below. Alternatively, for low-cost embedded devices, a low-resolution image capture device may be used, capturing frames of image data at 320×240 or below. In certain cases, even cheap low-resolution image capture devices may provide enough visual information for speech processing to be improved. As before, the image capture device 230 may also include image pre-processing and/or filtering components (e.g., contrast adjustment, noise removal, color adjustment, cropping, etc.). The components and methods described herein are able to accommodate a wide variety of audio formats due to the joint configuration stage.

In certain cases, the image capture device may comprise one or more lenses to capture a wide view of a visual environment. For example, the lens may comprise a wide-angle or fish-eye lens that is able to capture views of up to 180 degrees. In certain cases, image data may be captured from 360-degree panoramic cameras (e.g., as mounted on the top of vehicles or the like). The captured image data need not be interpretable by human beings; joint configuration of the combined speech processing system will "learn" relevant feature representations from a wide array of image formats.

The client device 210 of FIG. 2 also comprises an audio feature extractor 240 and a visual feature extractor 250. The audio feature extractor 240 is communicatively coupled to the audio capture device 220 and the visual feature extractor 250 is communicatively coupled to the image capture device 230.

The audio feature extractor 240 is configured to receive audio data from the audio capture device 220. This may comprise sets of raw audio samples and/or pre-processed audio data. In one case, the audio feature extractor 240 is configured to receive audio data in an initial tensor form, e.g., a fixed-length array of audio elements. The audio data may be Pulse Code Modulated audio data that has a magnitude supplied per time sample. The audio data may comprise data for one time sample (e.g., be supplied as a sequence) data, for a set of time samples and/or be received as a frame of data corresponding to a predefined time window. For example, at a sampling rate of 44.1 kHz an array of audio data for one channel for a one second window may comprise 44100 samples, e.g., 44100 8, 16 or 24-bit values. Audio data may be supplied in rolling sets of samples covering time periods oft seconds. In one case, the audio feature extractor 240 may be configured to receive the audio data as a frame of frequency data, e.g., as a set of amplitude (and/or phase) values for a range of frequencies for one or more time points.

The audio feature extractor 240 is configured to receive the audio data from the audio capture device 240 and to generate one or more audio feature tensors 260. As described previously, an audio feature tensor may comprise an array of values that has one or more dimensions. In one case, the audio feature tensor may comprise a vector of numeric values representing audio features detected in the audio data. For example, the audio feature tensor may comprise a 16, 32, 64, or 256-element array of 8 or 16-bit integer values, or of 32-bit or 64-bit floating point values. In one case, the audio feature tensor 260 may comprise an array of one or more binary or integer values. In this case, the elements of the visual feature tensor 270 may represent flags or classifications that identify particular audio environments (e.g., "indoor/outdoor", "in car/outside car", "crowd/non-crowd", "loud/quiet" etc.). In another case, the audio feature tensor 260 may comprise two or more dimensions, e.g., a second dimension may represent a series of time samples and/or each dimension may represent a different feature set. For example, an audio feature tensor 260 generated for an utterance may comprise an $f_1 \times s_1 \times t_1$ tensor (e.g., $A[i, j, k]$) representing $f_1$ features from $s_1$ feature sets over $t_1$ time samples.

The visual feature extractor 250 is configured to receive image data from the image capture device 230. This may comprise sets of raw image or video frames and/or pre-processed image data. In one case, the visual feature extractor 250 is configured to receive image data in an initial tensor form, e.g., a sequence of one or more y by x by c image planes and/or a volume of such planes across an additional time dimension (e.g., y by x by c by t)—where y is a number of rows (e.g., an image height), x is a number of columns (e.g., an image width) and c is a number of color channels (e.g., 3 for RGB). In certain cases, the image data may be synchronized with the audio data, e.g., such that image data at time t corresponds to an audio sample at the same time; in other cases, the image data may not be temporally correlated with the audio samples, e.g., may be image data captured shortly before, during and/or after an utterance is made.

The visual feature extractor 250 is configured to receive the image data from the image capture device 230 and to generate one or more visual feature tensors 270. As described previously, a visual feature tensor may comprise an array of values that has one or more dimensions. The visual feature tensors 270 may have a form that is similar to the audio feature tensors 260; in certain cases, the visual feature tensors 270 may differ from the audio feature tensors 260 by at least one of size, dimensions, and data type. In one case, the visual feature tensor may comprise a vector of numeric values representing visual features detected in the image data. For example, the visual feature tensor may comprise a 16, 32, 64, or 256-element array of 8 or 16-bit integer values, or of 32-bit or 64-bit floating point values. In one case, the visual feature tensor 270 may comprise an array of one or more binary or integer values. In this case, the elements of the visual feature tensor 270 may represent flags or classifications that identify particular visual environments (e.g., "indoor/outdoor", "in car/outside car", "crowd/non-crowd", "location classification" etc.). In another case, the visual feature tensor 270 may comprise two or more dimensions, e.g., a second dimension may represent a series of time samples and/or each dimension may represent a different feature set. For example, a visual feature tensor 270 generated for an utterance may comprise an $f_2 \times s_2 \times t_2$ tensor (e.g., V [i, j, k]) representing $f_2$ features from $S_2$ feature sets over $t_2$ time samples. In this case $f_1$, $s_1$, and $t_1$ may or may not equal $f_2$, $S_2$, and $t_2$. In certain cases, an optimal feature tensor size may be selected as a trade-off between accuracy and negative effects on training time and inference speed.

Returning to FIG. 2, the client device 210 comprises a transmitter 280 to transmit the audio feature tensor 260 and the visual feature tensor 270 to a server device, e.g., similar to the server device 120 shown in FIG. 1. The transmitter 280 may, in a similar manner to the receiver 122 of FIG. 1, comprise a communications interface and implementations of one or more communications protocols (e.g., in a multi-layer communications stack). The transmitter 280 may be configured to transmit data from the client device 210 over one or more networks, such as network 130 shown in FIG. 1. In one implementation, the transmitter 280 may comprise a wired or wireless physical interface and one or more communications protocols that provide methods for initiating requests in a predefined format. In one case, the transmitter 280 may transmit data over a configured communication link, e.g., as set up using a device address and port number. The transmitter 280 may be configured to transmit data to an application layer interface identified using a particular Internet Protocol address (and in some cases a port number).

As described with reference to FIG. 1, the audio feature tensor 260 and the visual feature tensor 270 may be used by a linguistic model at the server device to parse an utterance associated with the initially captured audio data and image data. In one example, the audio feature tensor 260 and the visual feature tensor 270 may be used directly to determine a voice command represented by the utterance. In other examples, the audio feature tensor 260 and the visual feature tensor 270 may be used as additional inputs, together with the audio data, to parse the utterance. In both cases, at least the visual feature tensor 270 provides a numeric representation of a visual context for the environment of the utterance. The audio feature tensor 260 may provide one or more of a numeric representation of the utterance itself or a numeric representation of an acoustic context for the environment.

In one case, the audio data may comprise multiple portions, a first portion representing an ambient audio recording of an environment and a second portion representing an audio recording of the utterance. The first portion may be recorded before, during or after the second portion. The first portion of audio data may be processed by the audio feature extractor 240 to generate the audio feature tensor 260 and the second portion of audio data may be transmitted to parse the utterance together with the audio feature tensor 260. An utterance may be defined as a period of captured speech between sections of an audio time series that does not feature captured speech; the audio data may represent both.

In certain cases, multiple frames of image data may be captured at different times. For example, a frame of image data may be captured at one or more of the following times: prior to an utterance, at the start of an utterance, during an utterance, at the end of an utterance, and/or after the utterance. Frames of image data may be buffered so that image data may be processed from different times. In certain cases, a buffer may be populated with a plurality of frames from specific portions of an utterance and the plurality of frames may be taken as a data volume for input into the visual feature extractor.

An Example Motor Vehicle

FIG. 3A shows one example implementation of a client device 300. This may be an implementation of the client device 116 of FIG. 1 or the client device 210 of FIG. 2. In this case, the client device is incorporated into an automobile 305. FIG. 3A shows a side view of the automobile 305. The automobile 305 comprises a control unit 310 for controlling components of the automobile 305. The components of the client device 210 may be incorporated into this control unit 310. In other cases, the components of the client device 210 may be implemented as a separate unit with an option of connectivity with the control unit 310. The automobile 305 also comprises a number of image capture devices 315, 320 and 325. These include a plurality of external video cameras 315 and 320 and at least one internal video camera 325. In this example, the image capture devices 315, 320 and 325 may be communicatively coupled to, and controlled by, the control unit 310. The plurality of external video cameras 315 and 320 may be used for parking operations and/or for autonomous driving functions. The at least one internal video camera 325 may be used for video communications, e.g., voice over Internet Protocol calls with video data, and/or for environmental monitoring.

The automobile 305 in the present example comprises front seats and rear seat for holding passengers in an orientation for front-mounted microphones 330 for speech capture. The automobile 305 may also comprise a driver visual console (not shown) with safety-critical display information and/or a general console (not shown) with navigation, entertainment, and climate control functions. The driver visual console and the general console may also be communicatively coupled to the control unit 310. The control unit 310 in this example further comprises a local processing module and wireless network communication module.

In this example, the front-mounted microphones 330 may implement the audio capture device 220 of FIG. 2, one or more of the image capture devices 315, 320 and 325 may implement the image capture device 230. The local processing module may comprise at least one processor and memory to implement the audio feature extractor 240 and the visual feature extractor 250. The wireless network communication module may implement the transmitter 280.

In certain cases, the automobile may further comprise additional audio capture devices, such as side-mounted microphones, a front overhead multi-microphone speech capture unit, and a rear overhead multi-microphone speech capture unit. The side microphones and front and rear speech capture units may provide for capturing speech audio, canceling noise, and identifying the location of speakers. In this case, one or more of these microphones and capture units may provide audio data to the control unit 310 to implement the audio feature extractor 240. The control unit 310 is configured to generate a set of one or more visual feature tensors from the image data obtained by one or more of the image capture devices 315, 320 and 325. The wireless network communication module may transmit audio and visual feature tensors that are generated by the control unit 310 to a remote server for processing. In certain cases, the control unit 310 may also implement server-side functionality such as server device 120 in FIG. 1. This may be the case in an "offline" mode. In one case, one or more microphones and capture units may capture audio data featuring an utterance and one or more other microphones and capture units may capture audio data for the generation of an audio feature tensor. In another case, each available microphone and capture unit may supply a different channel of audio data that is processed to generate at least audio feature tensors for utterance parsing.

An Example Mobile Computing Device

FIG. 3B shows another example of a client device 350. This may be an implementation of the client device 112 of FIG. 1 or the client device 210 of FIG. 2. In this case, the client device is incorporated into a mobile computing device 355. FIG. 3B shows a front and back view of the mobile computing device 355. The mobile computing device 355 may comprise a smartphone or tablet. The front of the mobile computing device 355 features a display screen 360 for displaying information to a user. The display screen may comprise a touchscreen. The front of the mobile computing device 355 also features a front-facing camera 365 and a front-facing microphone 370. The rear of the mobile computing device 355 features a rear-facing camera 375 and a lower internal microphone 380. The rear view of the mobile computing device 355 also highlights an internal multi-core processor 390 and a wireless network communication module 395. The mobile computing device 355 may feature a plurality of additional components but these are not shown for clarity. The front and rear facing cameras 365, 375 may comprise static or video cameras.

In use, one or more of the front-facing microphone 370 and the lower internal microphone 380 may be used to implement the audio capture device 220 of FIG. 2. As described with the example of FIG. 3A, one microphone may capture speech data (i.e. an utterance) and one microphone may capture ambient sound data; or both microphones may be used to provide multi-channel audio data featuring an utterance as well as periods where speech is absent. Similarly, one or more of the front-facing camera 365 and the rear-facing camera 375 may be used as the image capture device 240 of FIG. 2. In one case, image data may be captured from the camera that best shows an environment of a user, e.g., if the mobile computing device

355 is face-up on a table, then image data may be captured from the front-facing camera 365; if a user is walking or holding the mobile computing device 355 in front of them image data may be captured from both cameras; if a user is holding the mobile computing device 355 to their ear then only the rear-facing camera 374 may be used.

In the example of FIG. 3B, the multi-core processor 390 may implement the audio feature extractor 240 and the visual feature extractor 250 of FIG. 2. In one case, these may comprise computer program code that is loaded from a memory and executed as parallel threads on the multi-core processor 390. In other examples, the mobile computing device 355 may comprise dedicated digital signal processors to implement each of the audio feature extractor 240 and the visual feature extractor 250 of FIG. 2. Multiple approaches are possible.

In one case, a decision of whether to use image data may be left to the implementation of the visual feature extractor 250. For example, frames from both the front and rear facing cameras 365, 375 may be supplied as different channels to the visual feature extractor 250. In another case, the multi-core processor 390 may implement a switch that selects from the front and rear facing cameras 365, 375 to supply a single frame of image data. In the example of FIG. 3B, the wireless network communications module may comprise a cellular data or wireless networking module to implement the transmitter 280 of FIG. 2.

Client Server Communications

Figure 4A:
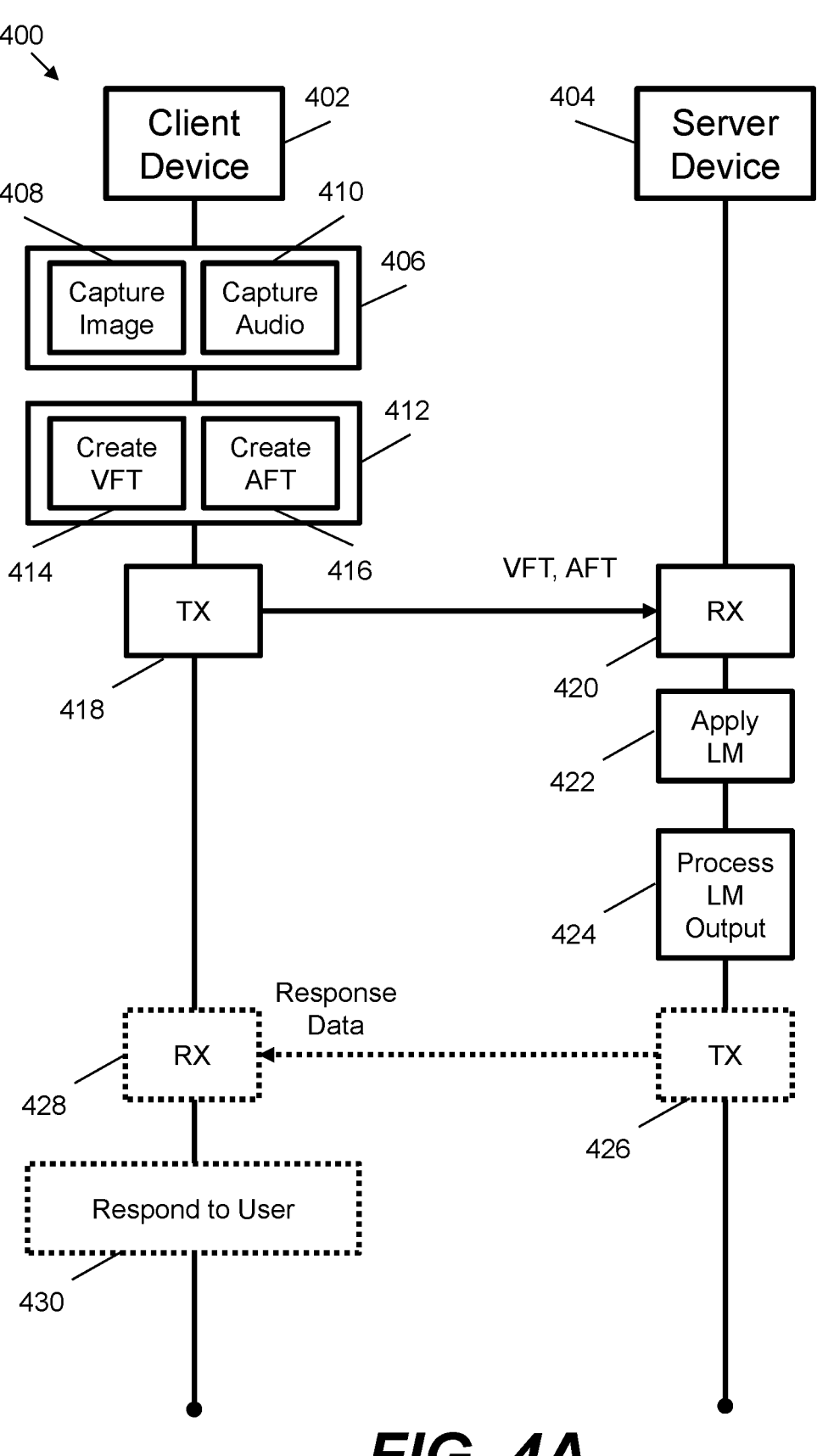
FIGS. 4A, 4B and 4C are sequence diagrams showing communications between a client device and a server device according to examples.
Figure 4B:
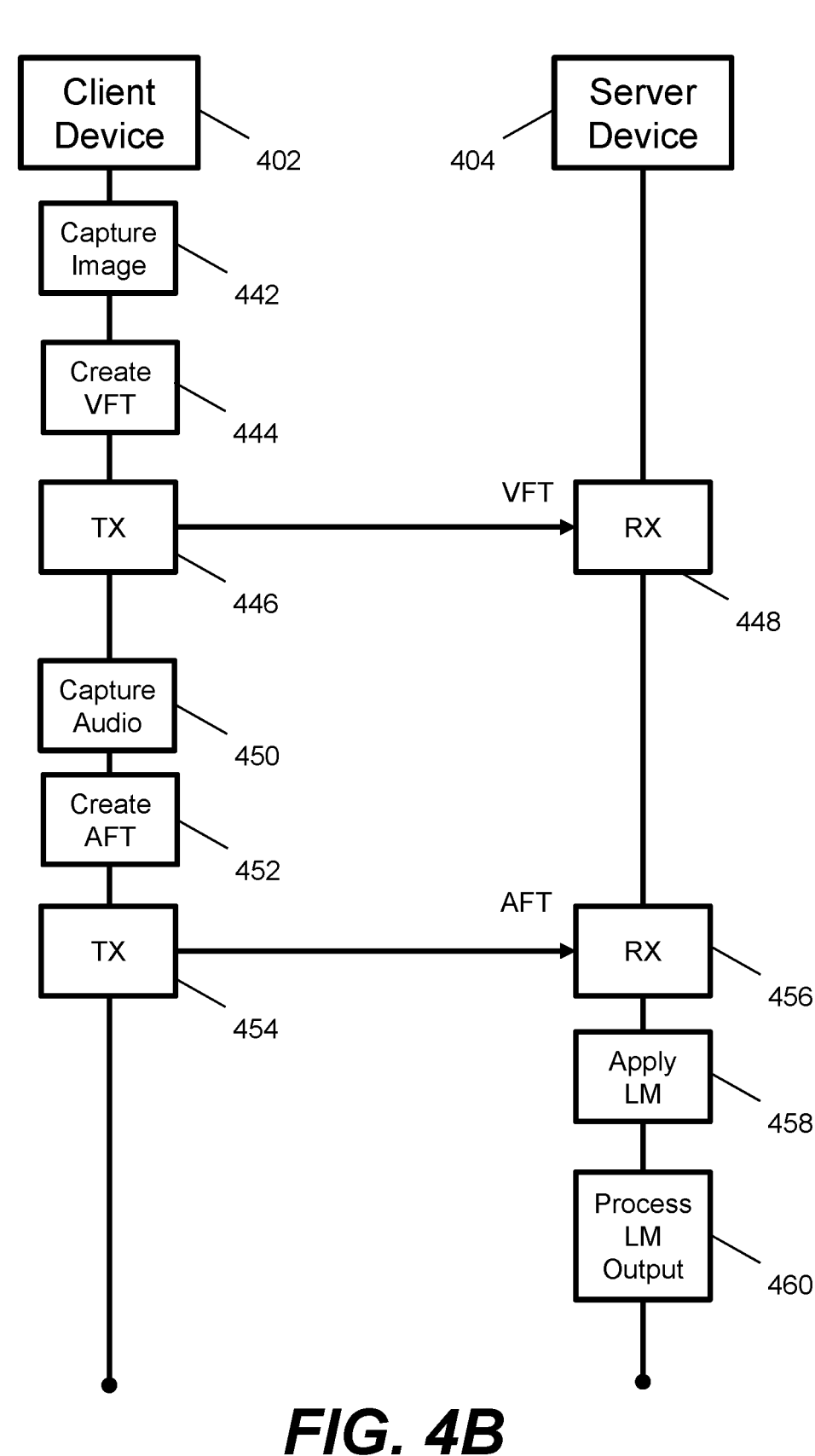
Figure 4C:
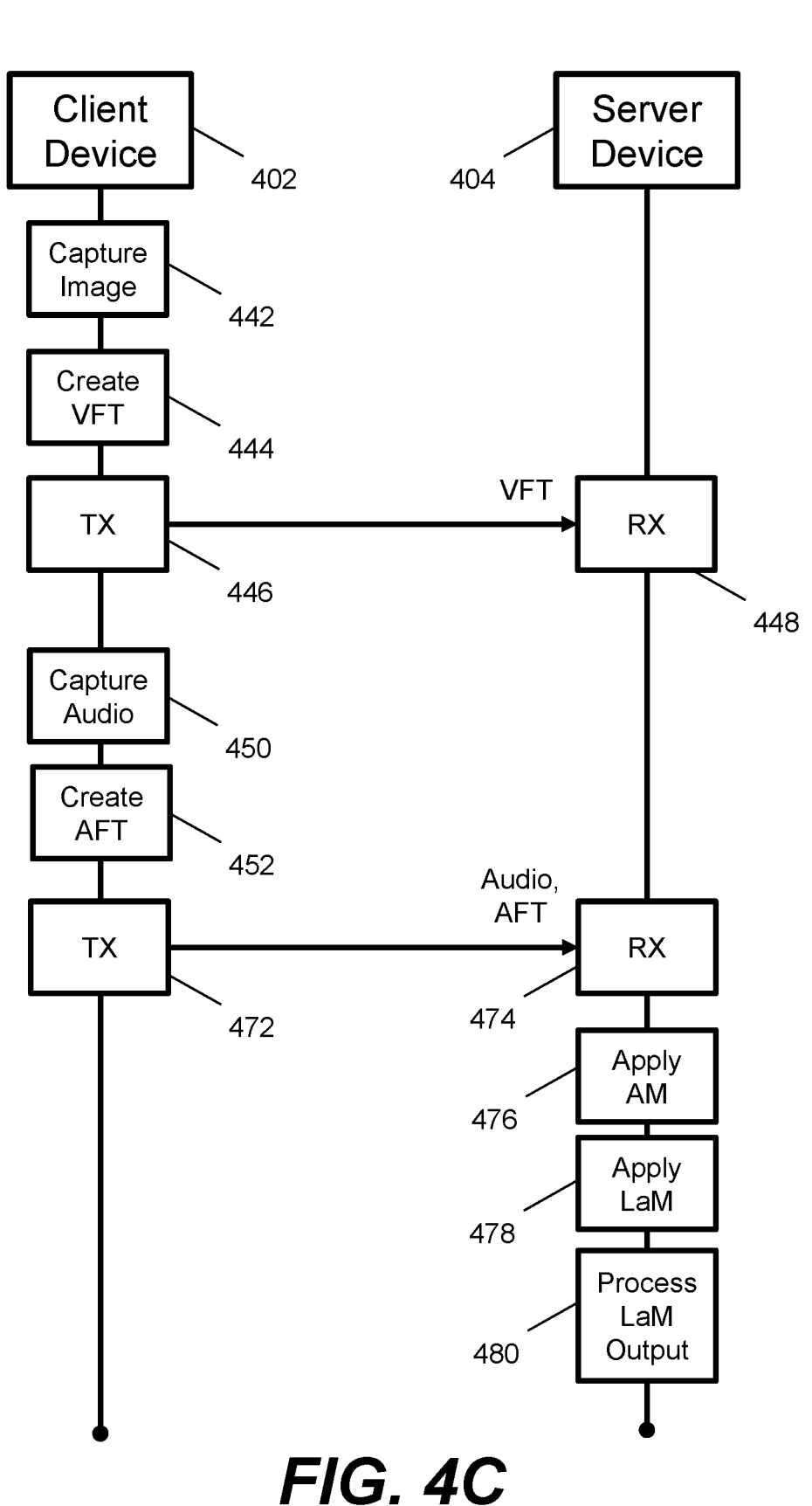

FIGS. 4A, 4B and 4C show a set of sequence diagrams 400, 440, 470 that represent different communications between a client device 402 and a server device 404. The client device 402 may comprise one of the client devices 110 in FIG. 1, client device 210 in FIG. 2 and/or one of the client devices 300, 350 shown in FIGS. 3A and 3B. The server device 404 may comprise the server device 120 from FIG. 1.

FIG. 4A shows a first sequence diagram 400 setting out one set of processes to parse an utterance of a user. At block 406, image data is captured at subblock 408 and audio data is captured at subblock 410. Subblocks 408 and 410 may be performed in parallel, e.g., as separate processing threads and/or by different hardware devices. Block 406 may comprise the capture of multiple data samples over a time period of the utterance. In one case, block 406 may comprise generating video and audio data channels for a common video recording. Subblocks 408 and 410 may be respectively performed by the image and audio capture devices 230, 220 in FIG. 2.

At block 412, visual feature tensors are generated at subblock 414 and audio feature tensors are generated at subblock 416. Subblocks 414 and 416 may be performed in parallel, e.g., as separate processing threads and/or by different hardware devices. Subblocks 414 and 416 may be respectively performed by the visual and audio feature extractors 250, 240 in FIG. 2.

At block 418, the client device 402 transmits the visual and audio feature tensors to the server device 404. This may be performed by the transmitter 280 of FIG. 2. The visual and audio feature tensors are received at the server device at block 420. Receipt of the tensors may be handled by the receiver 122 of FIG. 1. At block 422, a linguistic model (LM) is applied to the received visual and audio feature tensors. The linguistic model may comprise the linguistic model 124 as shown in FIG. 1. The linguistic model may comprise one or more of an acoustic model, a pronunciation model and a language model. The acoustic model may generate data indicative of a sequence of phonemes or other proto-language unit. The language model may generate text data. In one case, an output of the acoustic model may be received by the language model.

At block 424, the output of the linguistic model is processed. This may comprise parsing text data representing the utterance. Block 424 may comprise mapping data from the linguistic model to a voice command and a set of data for the voice command. Block 424 may involve identifying an appropriate service to execute the voice command from the output of the linguistic model. Block 424 may comprise making an application programming interface (API) request to an identified server, the request comprising a command and any command data identified from the output of the language model. For example, an utterance of "What is the weather today?" may result in a text output of "what is the weather today" that may be mapped to a weather service API request for weather data with a time parameter of "today", e.g., a current time or date.

In certain cases, the utterance may require no response from the server device 404. For example, a voice command to turn off a particular device may initiate a request to a device that is not the client device 402 and no feedback to the client device may be required. Or a voice command to send a notification to another user may also not require a response to be sent to the client device 402. However, in other cases, a response to the client device may be required or desired. These cases are illustrated by the dashed lines in FIG. 4A.

In cases, where the execution of block 424 results in information that is to be fed back to the client device 402, at block 426 this information may be packaged and transmitted to the client device 402. For example, in one case, the receiver 122 of FIG.1 may comprise a transceiver that is capable of transmitting a response over the network 130. At block 428, a response to the utterance, e.g., as captured at block 406, is received at the client device 402. In this case, the transmitter 280 may also comprise a transceiver that is capable of receiving data over the network 130. The response to the utterance comprises response data. This may comprise machine readable data to be communicated to the user, e.g., via a user interface or audio output. At block 430, the response data is processed and a response to the user is output by the client device 402. This may be the display of text and/or images on the display screen 360 in FIG. 3B, or an output of sounds via a text-to-speech module. In certain cases, the response data may comprise audio data that may be processed at the client device and used to generate an audio output, e.g., via one or more speakers. In the automobile example of FIG. 3A, a response may be spoken to a user via speakers mounted within the interior of the automobile 305 and/or information displayed on a general console.

FIG. 4B shows an alternative set of communications that may be performed in certain implementations. The communications are still between a client device 402 and a server device 404. However, in the case of FIG. 4B, image data and audio data are processed at separate times.

At block 442 of FIG. 4B, one or more frames of image data are captured. This may comprise capturing a still of image data from a camera or capturing a group of frames from a video. Block 442 may be performed periodically, e.g., every t seconds or minutes, or may be triggered by a user action, e.g., the detection of movement or a start of speech. Block 442 may comprise a similar process to subblock 408 in FIG. 4A.

At block 444, at least one visual feature tensor is generated based on the one or more frames of image data captured at block 442. Again, this may comprise a similar process to subblock 414 in FIG. 4A. Block 444 may also be performed periodically or based on a trigger condition. In certain cases, block 444 may be performed in response to the presence of the frame of image data, e.g., as received from an image capture device. If multiple frames of image data are captured at block 442 this may result in a plurality of visual feature tensors. In other cases, e.g., where the visual feature extractor comprises a sequence processor, multiple input frames of image data may result in a single visual feature tensor.

At block 446, the at least one visual feature tensor generated at block 444 is transmitted from the client device 402 to the server device 404. This may comprise a similar process to block 418 in FIG. 4A, only in this case, no audio feature tensor is transmitted at this time. At block 448, the server device 404 receives the at least one visual feature tensor. At this stage, the server device 404 may initiate actions to configure the linguistic model based on the received data. In certain configurations, blocks 442 to 448 may be repeated periodically such that the server device 404 has a visual environment state in the form of at least one visual feature tensor that is available for configuration of the linguistic model. For example, blocks 442 to 448 may be repeated every minute, every 5 minutes or every hour. In certain cases, blocks 442 to 448 may be triggered based on changes in accelerometer and/or location data at the client device 402, e.g., they may be performed if movement is detected following a period of no movement (or movement below a predefined threshold) or if the client device 402 leaves a particular geo-fenced location. In this manner, the server device 404 may receive an updated visual feature tensor when an environment of the client device 402 changes. In cases where one or more of blocks 442, 444 and 446 are performed based on a trigger event, this may help reduce energy consumption. This may be of benefit when the client device 402 is battery powered, e.g., a smartphone or a sensor device. For example, processing associated with one or more of image capture and visual tensor generation may be performed under certain conditions, e.g., including when an environment changes or an utterance is detected. In certain cases, a visual processing pipeline may be inhibited when battery power is low; while reducing accuracy it may also preserve processing resources when use is constrained.

Returning back to the client device 402 in FIG. 4B, in blocks 450 to 456 a similar set of operations to blocks 442 to 448 are performed to send an audio feature tensor to the server device 404. In one case, blocks 442 to 448 and blocks 450 to 456 may be separate and independent processes that asynchronously transmit data to the server device 404. In this manner, blocks 450 to 456 may be performed before, during or after blocks 442 to 448.

At block 450, audio data is captured in a similar manner to subblock 410 in FIG. 4A. At block 452, at least one audio feature tensor is generated in a similar manner to subblock 416 in FIG. 4A. At block 454, the at least one audio feature tensor is transmitted to the server device 404 in a similar manner to block 446 in FIG. 4B or block 418 of FIG. 4A. At block 456, the server device 404 receives the audio feature tensor. Block 456 may be taken as a trigger to perform blocks 458 and 460, which are similar to blocks 422 and 424 of FIG. 4A. Although not shown, response data may also be transmitted from the server device 404 following processing of the linguistic model output at block 460, e.g., in a similar manner to blocks 426 to 430 of FIG. 4A.

The example of FIG. 4B shows how a visual and acoustic context of an environment may be maintained asynchronously at the server device 404. In one case, a working state of a linguistic model may be continually updated based on received visual and audio feature tensors, e.g., these may be used to set operating parameters of the linguistic model.

FIG. 4C shows a variation of the example of FIG. 4B. The variation of FIG. 4C may also be applied to other examples, such as FIG. 4A. In FIG. 4C, blocks 442 to 452 are the same as those described with reference to FIG. 4B. However, at block 472, audio data captured at block 450 is transmitted together with the audio feature tensor to the server device 404, where it is received at block 474. In the example of FIG. 4C, the linguistic model comprises an acoustic model (AM) and a language model (LaM). In this case, one or more of the audio feature tensor and the visual feature tensor provide a respective one or more of a visual and acoustic context for an environment of a user. The visual and/or the acoustic context may be used to configure one or more of the acoustic model and the language model. In one case, the acoustic model and the language model both receive the audio feature tensor and the visual feature tensor as input. In certain cases, the acoustic model and/or the language model may receive inputs in addition to the audio feature tensor and the visual feature tensor. In FIG. 4C, the acoustic model receives the audio feature tensor and the visual feature tensor as a configuration input and the audio data received at block 474 as an input associated with a particular utterance. In one case, numeric representations of two or more of the audio feature tensor, the visual feature tensor and the audio data may be combined, e.g., concatenated into a larger vector of numeric values and/or a multidimensional volume of data values. In certain cases, the audio data may be streamed during the transmission at block 472; in other cases, the audio data may comprise a different set of audio features to the audio feature tensor, e.g., a stream of frequency features as compared with a fixed-length vector. At block 476, the acoustic model is applied, e.g., to the inputs as discussed. At block 478, a language model is applied to the output of the acoustic model. For example, the acoustic model may output a sequence of phonemes (e.g., a sequence of text symbols or integers representing each phoneme in a selected or detected language). The language model may this receive the audio feature tensor and the visual feature tensor as a configuration input and the phoneme sequence output following block 476 as an input associated with a particular utterance. The language model may output text or a voice command representation, e.g., identified data objects associated with particular command. In the latter case, for example, a command set may represent a plurality of commands as classes or computer objects, where the objects may have associated data and methods. At block 480, the output of the language model is processed. This may comprise parsing a text output or selecting a voice command representation and initiating a method available to that representation, in certain cases with data from the language model output. Again, blocks similar to 426 to 430 of FIG. 4A may also be performed.

Neural Network Implementations

In certain examples, one or more of the audio feature extractor, the visual feature extractor and the linguistic model may comprise a neural network architecture. In one case, each of these components may comprise a neural network architecture. In this latter case, the combined neural network architecture may be trained end-to-end to jointly configure the components.

In one case, the visual feature extractor and the audio feature extractor comprise one or more of a convolutional neural network and a recurrent neural network. For example, the visual feature extractor may comprise a convolutional neural network and the audio feature extractor may comprise a recurrent neural network. In the latter case, the audio feature tensor may comprise one or more of a hidden state of the recurrent neural network, e.g., following a sequence of time samples, and/or an output of the recurrent neural network, e.g., a combined output sequence following a set of input time samples and/or an output taken following the input of a set of input time samples representing the utterance.

Visual Feature Extractor

Figure 5:
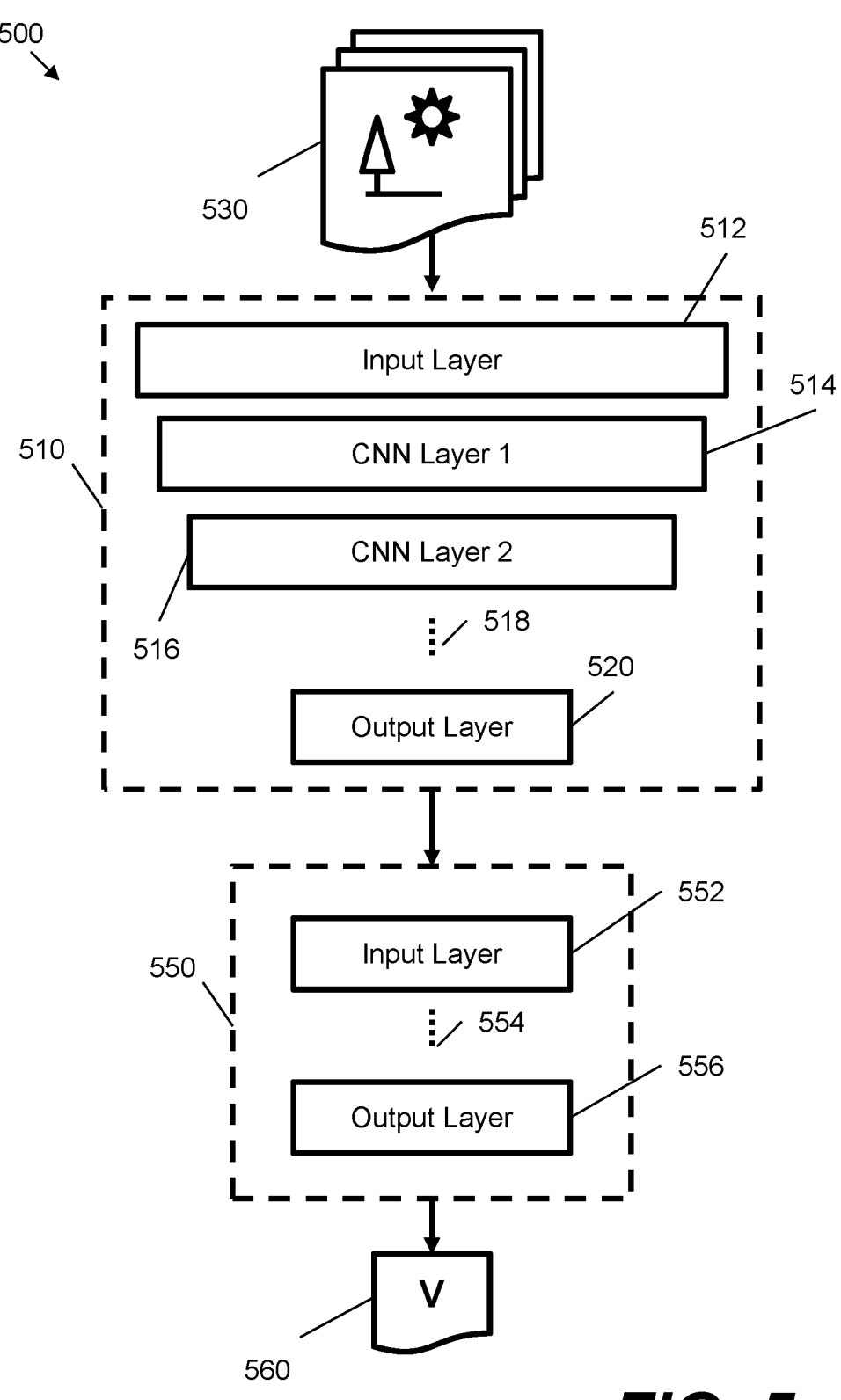
FIG. 5 is a schematic illustration showing a visual feature extractor according to an example.

FIG. 5 shows an example implementation of a visual feature extractor 500. For example, the implementation may be used to implement the visual feature extractor 250 in FIG. 2. In this example, the visual feature extractor 500 comprises a first convolutional neural network architecture 510 and a second neural network architecture 550.

The first convolutional neural network architecture 510 comprises a plurality of layers 512 to 520. These include a first input layer 512 to receive a frame of image data 530 and a first output layer 520 to output a processed representation of the frame. Between the first input layer 512 and the first output layer 520 there are a plurality of convolutional neural network layers 514, 516 and 518. In certain architectures there may be one or more feed-forward neural network layers between a last convolutional neural network layer and the output layer 520. The convolutional neural network architecture 510 may comprise an adapted form of the AlexNet, VGGNet, GoogLeNet, or ResNet architectures. The first convolutional neural network architecture 510 may be replaced in a modular manner as more accurate architectures become available.

In the present example, the first convolutional neural network architecture 510 is parameterized using a set of trained parameters for each of the plurality of layers. For example, these trained parameters may comprise at least a set of weights for each layer. In one case, the trained parameters may also include values for a set of biases for the layer. The weights may comprise weights for a fixed number of filters or kernels that are convolved with an input from an earlier layer. The hyperparameters for the first convolutional neural network architecture may be set via experimentation and/or using published sets of parameters with low error rates.

In the present example, the first convolutional neural network architecture 510 may be taken as a pretrained image classification architecture. For example, values for trained parameters may be acquired from published models with low error rates. In one case, the first convolutional neural network architecture 510 may initially comprise an image classification component that is configured, at an output layer, to output a one-hot vector (i.e. a vector of normalized values between 0 and 1) representing a set of image classifications (e.g., where the first element relates to a first classification, the second element relates to a second classification and so on). In this case, the image classification component may comprise a softmax layer as a last output layer. The trained parameters for the layers of the first convolutional neural network architecture 510 may be parameters that are derived from a training operation with one or more additional classification layers including a softmax layer coupled to the first output layer 520. To adapt the trained convolutional neural network architecture 510 for use as a visual feature extractor as described herein, at least the softmax layer may be removed such that the output layer 520 outputs a tensor of numeric values that are not one-hot representations or probabilities.

The second neural network architecture 550 comprises one or more layers 552 to 556. These include a second input layer 552 and a second output layer 556 (e.g., with respect to the visual feature extractor 500). The second input layer 552 is coupled to the first output layer 520 of the first convolutional neural network architecture 510. These layers may comprise, for example, convolutional or feed-forward layers 554. The second output layer 556 is configured to output the visual feature tensor. The second output layer 556 has a dimensionality (e.g., an array length or size) that is less than the dimensionality (e.g., an array length or size) of the first output layer 520. In one case, the second neural network architecture 550 may comprise at least a portion of an autoencoder or a variational autoencoder, where the output 560 of the second output layer forms a fixed length "code" of numeric values. In these cases, each layer of the second neural network architecture 550 may be configured to gen-erate a tensor output that has a length less than an input tensor to the layer, e.g., each layer may comprise a feed-forward or other reducing arrangement. In this manner, the second neural network architecture 550 forms an informa-tion "bottleneck" that during training results in the "code" representing a compressed representation of the output of the first output layer 520. In this case, an autoencoder arrangement may maximize information content per feature output, e.g., per element of the visual feature tensor. For example, a tensor received at the input layer 552 may be of length 4096 (i.e. have 4096 elements each represented by a floating point number), whereas a tensor output at the second output layer 556 may be of length 32 to 256. In certain cases, the second neural network architecture 550 may also quan-tize the output of the first convolutional neural network architecture 510, e.g., to produce a series of 8-bit integer values instead of 64-bit floating point values.

The second neural network architecture 550 may be jointly trained with the audio feature extractor and the linguistic model in a training operation. However, in a case where the first convolutional neural network architecture 510 is based on a pretrained image classification architec-ture, the set of trained parameters for the first convolutional neural network architecture 510 may be fixed during the training operation. In effect, the fixed image classification properties of the pretrained image classification architecture are retained and the modified output, e.g., a late layer output, is then compressed through the trained second neural net-work architecture 550 to learn an output visual feature tensor that represents salient features of the modified output for a speech processing use. The joint training of the second neural network architecture 550 results in the second neural network architecture 550 learning a transformation of a late output of the pretrained image classification architecture that makes the representation useful for reducing an error in utterance parsing. In this manner, catastrophic forgetting of the pretrained parameter values that generate useful image features within the pretrained image classification architec-ture may be avoided. The speech processing system may then quickly take advantage of state-of-the-art architectures by only retraining the second neural network architecture 550. Although, two neural network architectures are shown in FIG. 5, it should be noted that other examples may use a single neural network architecture to implement the visual feature extractor.

Neural Speech Processing System

Figure 6:
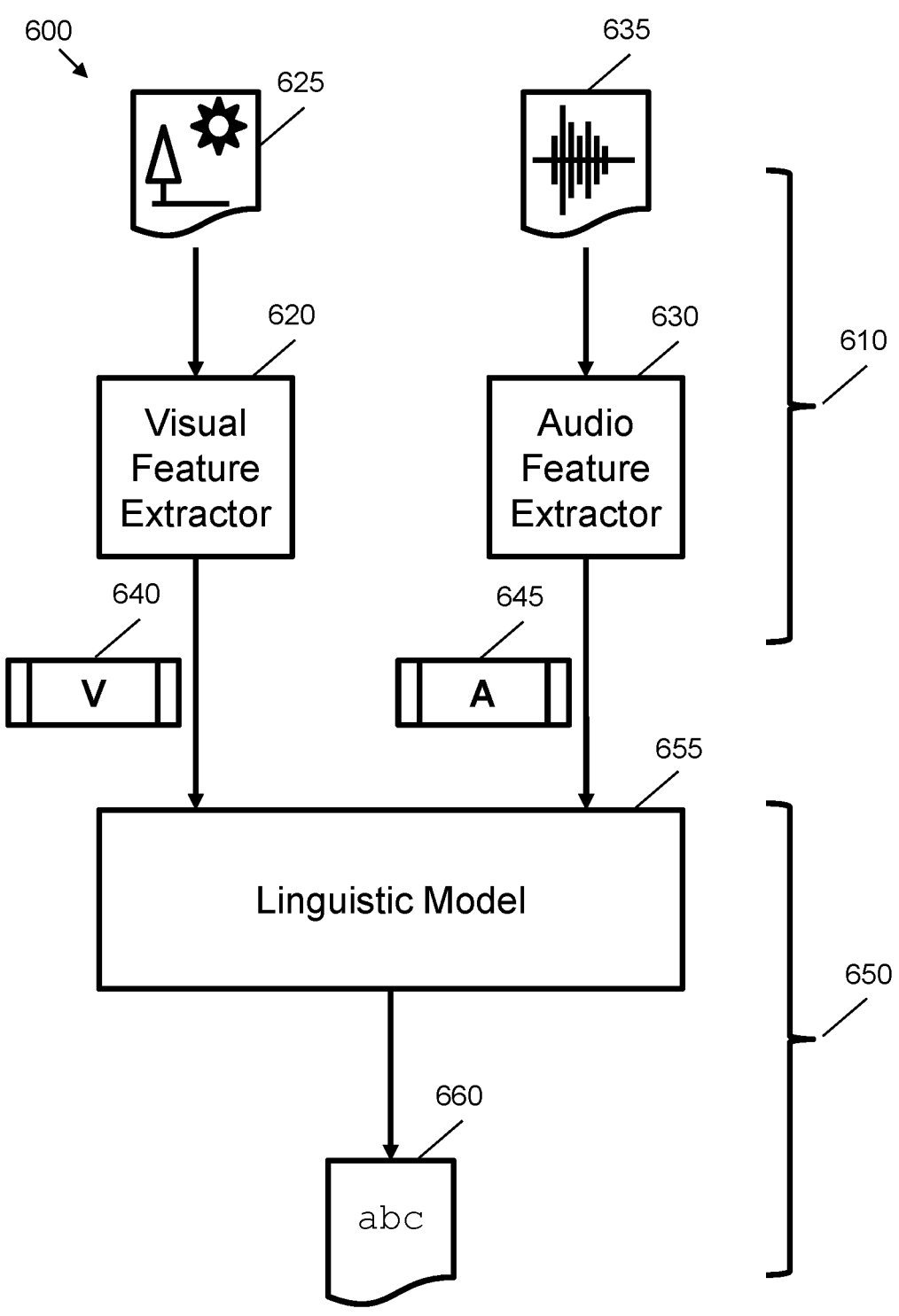
FIG. 6 is a schematic illustration showing a system for processing speech according to an example.

FIG. 6 shows a neural speech processing system 600 according to an example. The neural speech processing system 600 is split into client-side neural components 610 and server-side neural components 650. In this case, the term "neural" is used to signify that the systems and components comprise one or more neural network layers that may be trained using backpropagation and gradient descent approaches. Each neural network layer may be followed by a non-linear function (sometimes called "non-linearities" or activation functions), such that a plurality of neural network layers provide a non-linear mapping or transformation. The non-linear function may be a tanh or sigmoid function, or a REctified Linear Unit (RELU). Although the terms client-side and server-side are used, they may, in certain examples, relate to different components of a common computing device, e.g., two portions of control unit 310 in FIG. 3A, or two hardware devices within a common device, e.g., mobile computing device 355 in FIG. 3B.

The client-side neural components 610 comprise a visual feature extractor 620 and an audio feature extractor 630. The visual feature extractor 620 is configured to receive image data 625 and generate a visual feature tensor 640. The visual feature extractor 620 may be configured as described with reference to previous examples, e.g., FIGS. 2 and 5. The visual feature extractor 620 may comprise a convolutional neural network, e.g., as shown in FIG. 5, and/or an encoding portion of a neural autoencoder. In the latter case, the encoding portion may be trained to generate a compressed "code" that may be decoded by a decoding portion. In this case, the encoding and decoding portions may be trained by comparing original image data (e.g., as provided as input to the encoding portion) with reconstructed image data (e.g., as output by the decoding portion), where in use only the encoding portion is used to generate the visual feature tensors 640 from the compressed "code". In certain cases, an output of a first stage of the visual feature encoder 620 (e.g., an output of a convolutional neural network or an autoen-coder) may be input to a further recurrent neural network (such as a Long Short-Term Memory—LSTM—or a Gated Recurrent Unit—GRU) so as to consolidate this output over time. In these cases, one or more outputs of the recurrent neural network and/or a hidden state of the recurrent neural network may be taken as the visual feature tensor 620.

The audio feature extractor 630 is configured to receive audio data 635 and generate an audio feature tensor 645. The audio feature extractor 630 may be configured as described with reference to previous examples, e.g., FIGS. 2 and 5. Like the visual feature extractor 620, the audio feature extractor 630 may comprise one or more of a convolutional neural network and a recurrent neural network. The network architecture may depend on the format of the audio data. In a case where the audio data is provided as a set of frames representing spectrograms, then these frames may be pro-cessed by an architecture that is similar to the visual feature extractor 620 as described above, with each spectrogram being treated as a frame of image data. In a case where the audio data comprises sequences of mel-frequency cepstral coefficients, then these may be input into a recurrent neural network and the audio feature tensor 645 may comprise one or more outputs of the recurrent neural network and/or a hidden state of the recurrent neural network. The recurrent neural network may comprise an LSTM or GRU as above. In one case, different tiered hierarchies of recurrent neural networks may be provided to encode audio features at different temporal and/or frequency resolutions.

As described with reference to FIGS. 4A to 4C, the visual feature tensor 640 and the audio feature tensor 645 are communicated to the linguistic model 655. In this example, the linguistic model 655 also comprises a neural network architecture, e.g., one or more of a convolutional neural network and a recurrent neural network. In one case, the linguistic model 655 comprises a recurrent neural network that is configured to receive both the visual feature tensor 640 and the audio feature tensor 645 as input. In certain cases, the linguistic model 655 may comprise one or more convolutional neural networks or feed-forward neural networks to pre-process the visual feature tensor 640 and the audio feature tensor 645, e.g., apply an attention mechanism and/or further reduce dimensionality (e.g., a length of a combined array). In one case, the visual feature tensor 640 and the audio feature tensor 645 are combined by simple concatenation of tensors. In another case, a preprocessing function may be used to generate a merged tensor. In this case, the visual feature tensor 640 and the audio feature tensor 645 may comprise vectors of, say, length 32 to 512 elements, e.g., where each element is a floating-point value representing a normalized quantity (e.g., between 0 and 1). In this case, a concatenated input into a LSTM or GRU architecture may comprise a vector of, for example, 256 to 1024 elements.

The linguistic model 655 is configured to generate a text output 660. For example, this may be generated on a character-by-character, word-portion-by-word-portion, or word-by-word basis. Characters, word-portions or words may be selected from a vocabulary represented by a fixed-length output vector (e.g., there may be 30 elements for lower case characters and simple punctuation or up to 10,000 for words or word-portions). Word portions in this case may comprise stems, endings and/or word parts that are repeatedly used. In this case, the linguistic model 655 may be considered to encompass both acoustic and language modelling functionality.

The linguistic model 655 may construct an output text sequence in a number of ways. In one case, the output text sequence may be constructed by taking an output of a recurrent neural network over a sequence of time steps. For example, a visual feature tensor 640 and an audio feature tensor 645 may be generated for a plurality of time samples (e.g., at an input frame or data rate off Hz—which may be up to 30 or 60 Hz for video and higher for audio). If the visual feature tensor 640 and the audio feature tensor 645 are generated at different rates, then a tensor that changes at a slower rate may be held constant while changing values for the other tensor are input. In one case, there may only be one visual feature tensor 640 and a plurality of audio feature tensors 645 that are generated over a respective plurality of time steps. In one case, a visual feature tensor 640 may be omitted by providing either a zero-valued vector and/or a control code. Accommodation of absent visual feature tensors 640 may be trained by setting certain image inputs (or visual feature tensor inputs) to zero within training data. In another case, the visual feature tensor 640 and the audio feature tensor 645 may be concatenated and used to set an initial hidden state of a recurrent neural network. In this case, a first input may comprise a <START> control symbol and the first output symbol may be fed back to be used as a second input, with this process being repeated until an <END> control symbol is output. In this case, the recurrent neural network is adapted to receive symbols (e.g., character or words) as an input. In this case, the symbols may be initially mapped to a numeric representation, and then further mapped to a symbol embedding, before being provided to the recurrent neural network. Different variations may be provided depending on, for example, the form of the available data, the form of the architectures used, the temporal availability of data, the form of the output, the accuracy of the recurrent neural network, the length of a typical utterance and so on.

Training a Neural Speech Processing System

Figure 7:
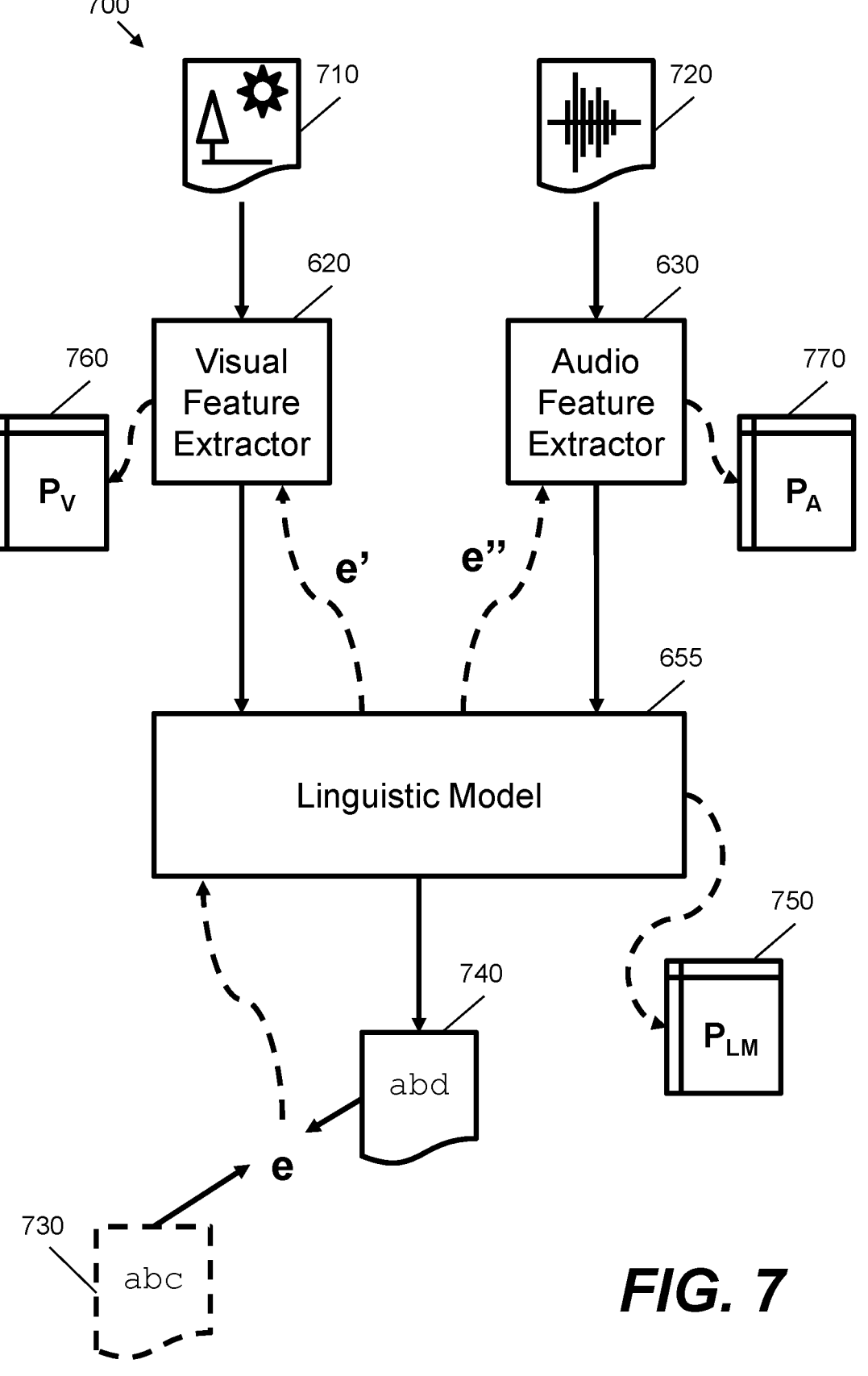
FIG. 7 is a schematic illustration showing an example of how the system of FIG. 6 may be trained.

FIG. 7 shows an example training configuration 700 for the neural speech processing system of FIG. 6. FIG. 7 shows a communicative coupling of the visual feature extractor 620, the audio feature extractor 630 and the linguistic model 655 of FIG. 6. In one case, for training, an implementation of each of the visual feature extractor 620, the audio feature extractor 630 and the linguistic model 655 may be configured on a single computing device or a suitably coupled cluster of computing devices. Training need not be performed on a production server device and the client devices, e.g., devices as shown in previous examples (although this could be performed if desired). In one case, training may be performed on a computing device with access to substantive processing resources, e.g., multiple processing units (whether CPUs, GPUs, Field Programmable Gate Arrays— FPGAs—or other dedicated processor architectures) and large memory portions to hold batches of training data. In certain cases, training may be performed using a coupled accelerator device, e.g., a couplable FPGA or GPU-based device. Training as shown in FIG. 7 may be referred to as "end-to-end" training, as the outputs of the visual feature extractor 620 and the audio feature extractor 630 are coupled to the input of the linguistic model 655 and the combined system is trained as a single unit.

In the present example, training is performed with respect to a set of training data. The set of training data comprises a data triple: image data 710, audio data 720 and ground truth text data 730. The image data 710 and the audio data 720 may be derived from a recording of an environment and may comprise a sequence of samples over time. During training the image data 710 is supplied to the visual feature extractor 620 and the audio data 720 is supplied to the audio feature extractor 630. In a forward pass, output text data 740 is generated as described with reference to FIG. 6. The generated output text data 740 is compared with the ground truth text data 730 and an error, e, is determined. In one case, the error may be determined by evaluating a loss function that takes output text data 740 and ground truth text data 730 as an input. In certain cases, an error is determined on a symbol-by-symbol basis (e.g., comparing a predicted symbol with a corresponding symbol in the ground truth text data 730).

Once an error, e, is determined, it is used to determine a change in parameter values throughout the system. This change may be determined by (automatically) differentiating each component in the system and flowing the error back through the system, using the differentials to determine a parameter update for each component. In FIG. 7, the error, e, is used to update a set of linguistic model parameters 750, and additional errors, e' and e", which are respectively propagated through the linguistic model 655 to each of the visual feature extractor 620 and the audio feature extractor 630. The errors e' and e" are used to update visual extractor parameters 760 and audio extractor parameters 770. Gradient descent may be used to determine a direction of parameter update that reduces the errors e, e' and e". As the system is trained as a whole, the visual extractor parameters 760 and audio extractor parameters 770 are adjusted in a manner that reduces a final output error of the linguistic model 655. Put another way, the visual extractor parameters 760 and audio extractor parameters 770 are adjusted such that the visual feature extractor 620 and the audio feature extractor 630 generate visual and audio feature tensors that are informative for the linguistic model 655 in generating a low-error output. Those skilled in the art will understand that there are many different methods to train a neural network architecture and that features such as hyperparameters, loss functions, gradient descent method, batching and others may be calibrated based on specific implementations.

In certain cases, a length of one or more of the visual feature tensor and the audio feature tensor may be set based on a training output. For example, an initial feature tensor length may be selected. An analysis of element values during training may then be performed. If an element has a particular proportion of its output below a predefined threshold (e.g., is mostly zero), that element may be omitted from a production feature tensor.

Acoustic Model Selection

Figure 8:
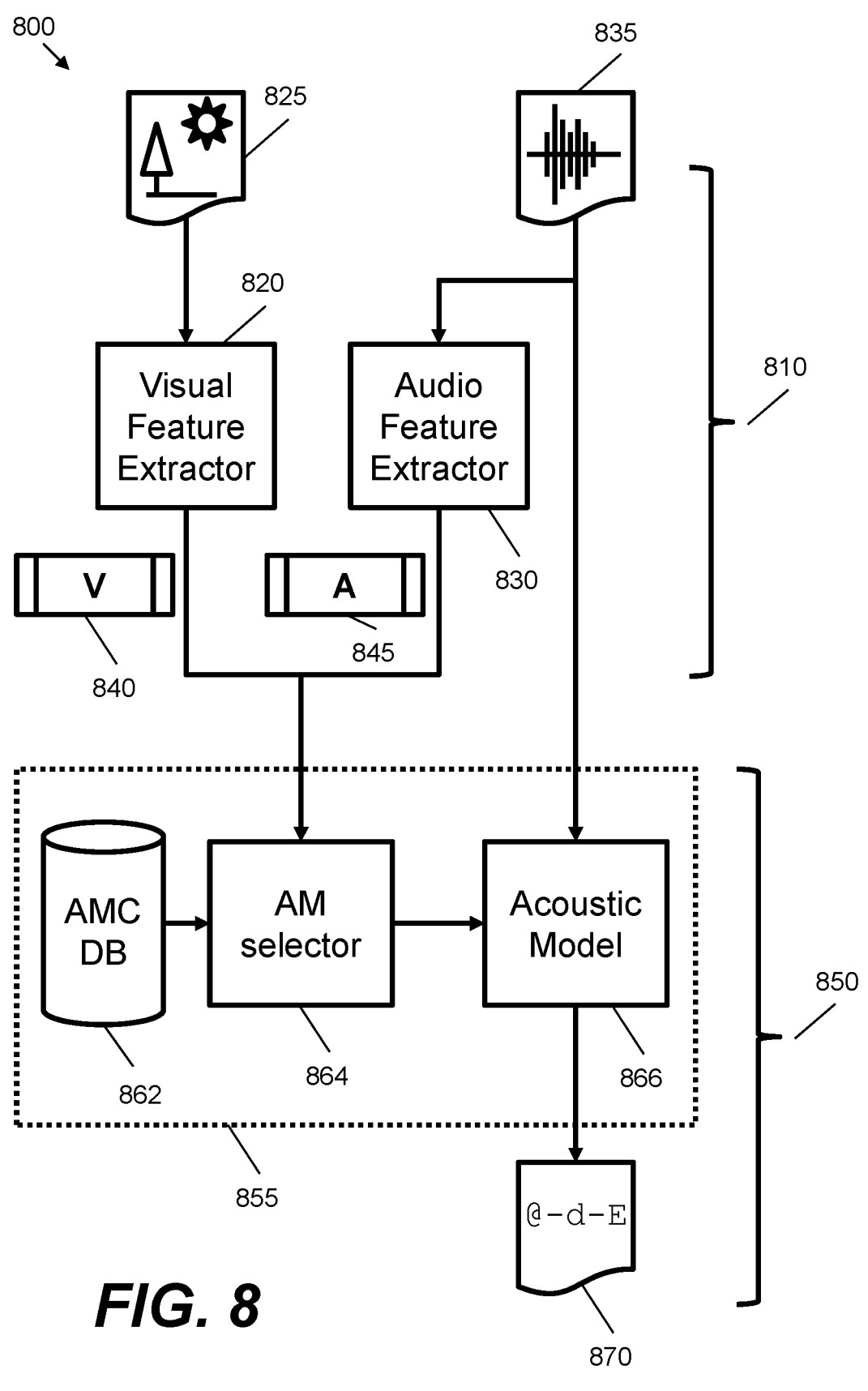
FIG. 8 is a schematic illustration showing a system for processing speech that comprises an acoustic model selector according to an example.

FIG. 8 shows an alternative speech processing system 800 that uses certain components described herein. As per FIG. 6 and previous examples, the alternative speech processing system 800 comprises a visual feature extractor 820, an audio feature extractor 830 and a linguistic model 855. These may comprise neural network components as previously described. The visual feature extractor 820 generates a visual feature tensor 840 from image data 825 and the audio feature extractor 830 generates an audio feature tensor 845 from audio data 835. The visual feature extractor 820 and the audio feature extractor 830 may form part of a client device 810 and the linguistic model 855 may form part of a server device 850. Similar reference numerals are used to refer to similar features, and the variations discussed above with respect to FIG. 6 may be applied to the arrangement of FIG. 8.

The alternative speech processing system 800 of FIG. 8 differs from the speech processing system 600 of FIG. 6 in that the linguistic model 855 comprises a number of sub-components. In this example, these comprise a database of acoustic model configurations 862, an acoustic model selector 864 and an acoustic model instance 866. The database of acoustic model configurations 862 stores a number of parameters to configure an acoustic model. In this example, the acoustic model instance 866 may comprise a general acoustic model that is instantiated (e.g., configured or calibrated) using a particular set of parameter values from the database of acoustic model configurations 862. For example, the database of acoustic model configurations 862 may store a plurality of acoustic model configurations. Each configuration may be associated with a particular class of acoustic model.

In a base case, there may be two acoustic model configurations. For example, these may relate to an "indoor" and "outdoor" acoustic model configurations. The acoustic model selector 864 receives the visual feature tensor 840 and the audio feature tensor 845 from the visual feature extractor 820 and the audio feature extractor 830. The acoustic model selector 864 may comprise a classifier that is configured to receive the visual feature tensor 840 and the audio feature tensor 845 as input and output a classification label. The output of the acoustic model selector 864 may comprise a tensor in the form of a vector with an element for each possible acoustic model configuration. In this case, the vector output of the acoustic model selector 864 may indicate probabilities (e.g., values between 0 and 1) of a different acoustic model configurations. In the base case, a vector or [0.6, 0.4] would indicate that a first acoustic model configuration (say "indoor") has a 60% probability or weighting and a second acoustic model configuration (say "outdoor") has a 40% probability or weighting. The probabilities may be sampled, or the largest probability may be selected, in order to determine which acoustic model configuration to use. Parameter values relating to a selected configuration may be retrieved from the database of acoustic model configurations 862 and used to instantiate the acoustic model instance 866. In the above example, the first acoustic model configuration is more likely based on the probabilities and so the acoustic model instance is more likely to be set as an "indoor" acoustic model. In other examples, there may be any number of different classifications and corresponding configurations (e.g., more than two).

In FIG. 8, the acoustic model instance 866, e.g., as configured by the acoustic model selector 864 using a configuration retrieved from the database of acoustic model configurations, also receives the audio data 835, e.g., from the client device 810. The acoustic model instance 866 is configured to generate phoneme data 870 for use in parsing an utterance associated with the audio data 835 (e.g., featured within the audio data 835). The phoneme data 870 may comprise a sequence of phoneme symbols, e.g., from a predefined alphabet or dictionary. Hence, in the example of FIG. 8, the acoustic model selector 864 selects an acoustic model configuration from the database 862 based on a joint set of the audio and visual feature tensors, and the acoustic model configuration is used to instantiate an acoustic model instance 866 to process the audio data 835.

In one case, the visual feature extractor 820, the audio feature extractor 830 and the acoustic model selector 864 may comprise neural network architectures. These features may be trained in combination as per FIG. 7. For example, training data in this case may comprise a triple of image data 825, audio data 835 and ground-truth acoustic model selections (e.g., classifications output by the acoustic model selector). In this case, the visual feature tensor 840 and the audio feature tensor 845 may be of a smaller size than the system 600 of FIG. 6; this is because these tensors only need to provide enough information to make an accurate acoustic model selection, rather than to generate a complete sequence output. In one case, the visual feature tensor 840 and the audio feature tensor 845 may be of a few bits or bytes in size, e.g., having 1 to 32 elements, where the elements may have a limited range such as be binary or low (<8) bit values. This form of implementation may thus be suitable where bandwidth is limited and/or the client device 810 has only limited processing resources.

In one case, the acoustic model instance 866 may comprise a non-neural model. For example, the acoustic model instance 866 may comprise a statistical model. The statistical model may use symbol frequencies (e.g., n-grams) and/or probabilities. In one case, the statistical model may comprise a Bayesian model, such as a Bayesian network or classifier. In these cases, the acoustic model configurations may comprise particular sets of symbol frequencies and/or prior probabilities that have been measured in different environments. The acoustic model selector 864 thus allows a particular environment for an utterance to be determined based on both visual and audio information, which may provide improvements over using audio data 835 on its own to generate phoneme sequence 870. In one case, the audio feature tensor 845 may allow for sources of noise in the environment to be used in configuring the acoustic model instance 866. In comparative examples, these sources of noise may be filtered out during speech processing (e.g., within the pipeline in FIG. 8 that leads from the audio data 835 to the acoustic model instance 866); however, sources of noise in the environment may be useful in determining global parameters (such as indoor/outdoor, crowded/quiet, windy/not-windy) that influence phoneme generation.

In a variation of the system 800, the visual feature extractor 820, the audio feature extractor 830, the acoustic model selector 864 and the acoustic model instance 866 may comprise neural network architectures. In this case, the database of acoustic model configurations 862 may be omitted and the acoustic model selector 864 may supply a tensor input to the acoustic model instance 866 to configure the instance. In this case, training data may be constructed from image data 825, audio data 835, and ground truth sets of phoneme outputs 870. Training of the combined system may again resemble the training shown in FIG. 7.

Alternative Example

In certain cases, aspects of the previously described linguistic models may be implemented as a speech processing apparatus. In this case, the speech processing apparatus may comprise an acoustic model to generate phoneme data for use in parsing speech data and a language model to generate a transcription of the speech data using the phoneme data from the acoustic model. The acoustic model may comprise an acoustic model as previously described, e.g., as implemented by the configured acoustic model instance 866 and/or as applied at block 476 of FIG. 4C. The acoustic model may comprise a statistical model or a neural network architecture. The language model may also comprise a language model as previously described, e.g., as applied at block 478 of FIG. 4C. The transcription may comprise a text-based output.

In addition to the acoustic model and the language model, the speech processing apparatus may also comprise a visual context indicator. The visual context indicator is communicatively coupled to at least one of the acoustic model and the language model. In certain cases, the visual context indicator may be coupled to both the acoustic model and the language model; in other cases, the visual context indicator may be coupled to just one of the acoustic model and the language model. The visual context indicator is configured to provide a representation of a visual environment in which the speech data is captured. For example, the visual context indicator may comprise a visual feature extractor as previously described. In one case, the visual context indicator may be located within the same device as the acoustic model and the language model, e.g., within a server computing device or in a single device such as the control unit 310 in FIG. 3A. In certain cases, the speech processing apparatus may form part of a client device as described herein, e.g., server-side functions as described may be moved to the client side. Different combinations are possible including different distributed configurations.

The visual context indicator is configured to provide the representation of a visual environment to at least one of the acoustic model and the language model. The representation may comprise a visual feature tensor as described herein, e.g., the visual context indicator may comprise a configuration similar to the visual feature extractor 500 of FIG. 5.

In the present examples, the visual context indicator may function in a similar manner to the acoustic model selector 864, e.g., set a configuration of at least the acoustic model. In general, in this example, at least one of the acoustic model and the language model are differentially configured based on the representation of the visual environment. Here the term "differentially" is used to indicate that the processing of the acoustic model and/or the language model may differ when different representations are provided, and may also further differ from a case where no representation is provided. In one case, speech processing is improved within one or more of the acoustic model and the language model based on the provided representation.

In one case, the representation may comprise a visual feature tensor as described herein. This may be used as an input to set the configuration of the acoustic model and the language model. In a case where at least one of the acoustic model and the language model comprise neural network architectures, the visual feature tensor may be used as part of the input to the neural network architecture and/or may be used to set a state of the neural network architecture. For example, if the representation comprises a vector of numeric values it may be concatenated to an audio-based input and/or may be used to set a hidden state of a recurrent neural network architecture. In this case, the speech processing apparatus may be seen as similar to a combination of the visual feature extractor 620 and the linguistic model 655 of FIG. 6, e.g., where audio data providing the speech data is provided as per FIG. 8.

In one case, the speech processing apparatus may further comprise a pronunciation model, e.g., to configure one or more of the acoustic model and the language model based on a particular model of how speech sounds are produced. The pronunciation model may adapt speech processing for particular dialects and accents, and/or particular users whose speech has been learnt over time. In certain cases, the representation, e.g., the visual feature tensor, may also be used to configure the pronunciation model; in other cases, the pronunciation model may not be configured based on the representation.

In one case, the visual context indicator may receive the representation from a remote visual feature extractor. In this case, the visual context indicator may or may not process the representation before use in configuring one or more of the acoustic model and the language model. In one case, the visual context indicator may receive image data or data derived from one or more images. In one case, the visual context indicator may be trained or configured jointly with one or more of the acoustic model and the language model. In another case, the visual context indicator may be trained or configured independently of one or more of the acoustic model and the language model, e.g., parameters of the acoustic model and/or the language model may be fixed when training the visual context indicator and parameters of the visual context indicator may be fixed when training the acoustic model and/or the language model.

Example Methods of Speech Processing

Figure 9A:
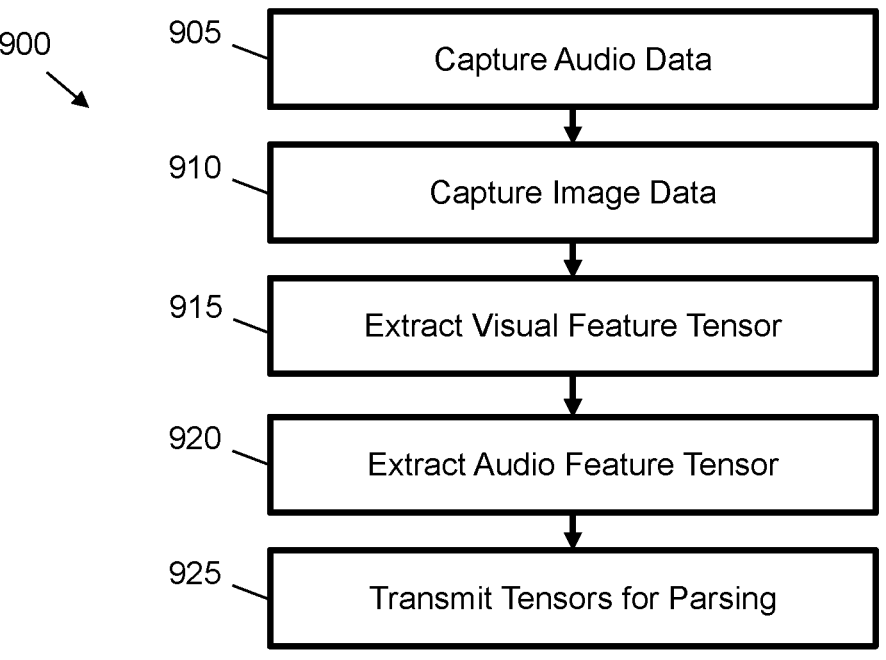
FIG. 9A is a flow diagram showing a method for processing speech at a client device according to an example.

FIG. 9A shows an example method 900 for processing speech at a client device. The method 900 begins at block 905 where audio data associated with an utterance from a user is captured. This may comprise capturing data from one or more microphones such as devices 330, 370 or 380 in FIGS. 3A and 3B. The audio data may comprise a portion of a recording prior or after to the utterance as well as the utterance itself. At block 910, image data featuring an environment of the user is captured. For example, the image data may be captured from a camera device such as one or more of 315, 320, 325, 365 and 375 in FIGS. 3A and 3B. In one case, the image data may be captured by receiving data from a camera that is external to the client device.

At block 915, the method comprises extracting, using a visual feature extractor, a set of visual feature tensors from one or more frames of the image data. The visual feature extractor may be part of the client device. The frames of image data have an information content that is greater than the set of visual feature tensors, e.g., may comprise more bits of information. The set of visual feature tensors may comprise one visual feature tensor or may comprise a sequence of visual feature tensors. For example, the former may be used for the system 800 of FIG. 8 and the latter may be used in the system 600 of FIG. 6. At block 920, extracting, using an audio feature extractor at the client device, a set of audio feature tensors from the audio data. Again, the set of audio feature tensors may comprise one audio feature tensor or may comprise a sequence of audio feature tensors; the former being used for the system 800 of FIG. 8 and the latter being used for the system 600 of FIG. 6.

At block 925, the set of audio and visual feature tensors are transmitted to a server device. This may comprise the server device 120 shown in FIG. 1 or the server side components 650, 850 shown in FIGS. 6 and 8. The server device is configured to supply at least the visual feature tensors and the audio feature tensors to a linguistic model, where the linguistic model is configured to determine a set of linguistic features that are usable to parse the utterance. The linguistic model may comprise one or more of an acoustic model, a pronunciation model and a language model, where the linguistic features may comprise one or more of a phoneme sequence, a character sequence, a word-portion sequence or a word sequence. In this method, the visual feature extractor and the audio feature extractor are jointly configured with the linguistic model, e.g., as explained with reference to FIG. 7.

Figure 9B:
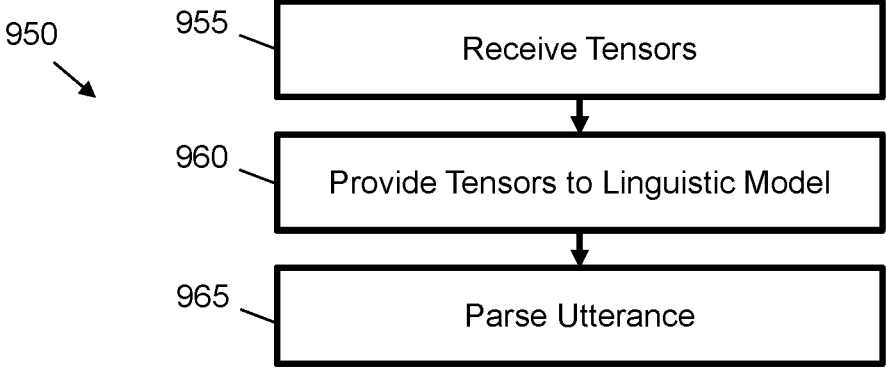
FIG. 9B is a flow diagram showing a method for processing speech at a server device according to an example.

FIG. 9B shows a method 950 for processing speech at a server device. The method may be performed after the method 900 and/or may be performed following another method of visual and audio feature generation. At block 955, a set of audio and visual feature tensors are received from a client device. The visual feature tensors may be generated as per block 915 in FIG. 9A, i.e. generated by a visual feature extractor of the client device based on frames of image data captured by the client device, where the frames of image data feature an environment of the client device. The audio feature tensors may be generated as per block 920 in FIG. 9A, i.e. generated by an audio feature extractor of the client device based on corresponding audio data captured by the client device in association with an utterance of a user.

At block 960, the set of audio and visual feature tensors are provided as input to a linguistic model. The linguistic model may comprise, for example, the linguistic model 124 of FIG. 1, the linguistic model 655 of FIG. 6 or the linguistic model 855 of FIG. 8. The linguistic model is configured to determine a set of linguistic features that are usable to parse the utterance, wherein the visual feature extractor and the audio feature extractor are jointly configured with the linguistic model. At block 965, the utterance is parsed using the output of the linguistic model. This may comprise determining a command and/or command data associated with the utterance. If so, the method may further comprise instructing execution of the command according to the command data. This may result in response data that may be transmitted to the client device. The client device may receive a response to the utterance from the server device and provide a corresponding response to the user, e.g., an output of the command execution.

In one case, the method at the server device further comprises selecting an acoustic model configuration based on the received set of audio and visual feature tensors, receiving the audio data, and applying an acoustic model configured according to the acoustic model configuration to the audio data to determine phoneme data corresponding to the utterance. This, for example, may be performed using the linguistic model 855 of FIG. 8. The utterance may thus be parsed using the phoneme data. In one case, the phoneme data may be input into a further linguistic processing pipeline to parse the utterance, e.g., the phoneme data may be processed into a linguistic transcription and this may be used to parse the utterance.

In certain cases, the linguistic model may comprise a statistical language model and a separate "meta" language model for environmental information, e.g., as derived from one or more of the visual feature tensor and the audio feature tensor. In this case, the meta language model may be configured to rescore alternate hypotheses as output by the statistical language model based on outputs of the meta model.

In certain cases, the linguistic model may comprise multiple models, e.g., that receive one or more of the audio data, the audio feature tensor and the visual feature tensor. In this case, the linguistic model may comprise an ensemble model that uses voting to determine linguistic features, such as a transcription. In certain cases, an acoustic model and/or a language model may output a plurality of candidate symbol sequences. In these cases, an additional stage of natural language processing that receives one or more of the audio feature tensor and the visual feature tensor may be configured to process the various sequence hypotheses and provide a score for each sequence as an output.

Method of Jointly Configuring

Figure 10:
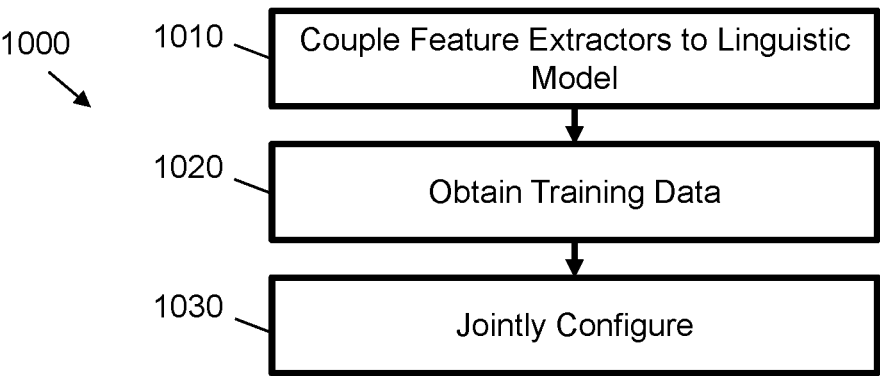
FIG. 10 is a flow diagram showing a method of configuring a system for processing speech according to an example.

FIG. 10 shows a method 1000 of configuring a system for processing speech according to an example. At block 1010, the method comprises communicatively coupling an audio feature extractor and a visual feature extractor to a linguistic model to obtain a speech recognition model. For example, this may comprise configuring the end-to-end system shown in FIG. 7. As shown in FIG. 7 the audio and visual feature extractors and the linguistic model may be parameterized by respective sets of model parameters, e.g., sets of weights and biases. At block 1020, the method comprises obtaining training data comprising temporally-correlated audio and image data and ground-truth linguistic features. In this case, the temporal correlation may be that the audio data and image data were both captured within a given time window of a user utterance. In certain cases, the image data and the audio data may collectively comprise video data where the audio data forms one or more audio channels for the video data. The ground-truth linguistic features may comprise one or more sequences of phonemes, characters, word portions and words. In one case, the ground-truth linguistic features may be provided in the form of a text transcription of the utterance. At block 1030, the method comprises jointly configuring the audio and visual feature extractors and the linguistic model using the training data to determine trained values for the respective sets of model parameters, including back propagating an error of the linguistic model through the speech recognition model. This may comprise performing the process illustrated in FIG. 7. Block 1030 may comprise defining a loss function and implementation a training routine as supplied in a library of neural network functions.

Example Server Device

Figure 11:
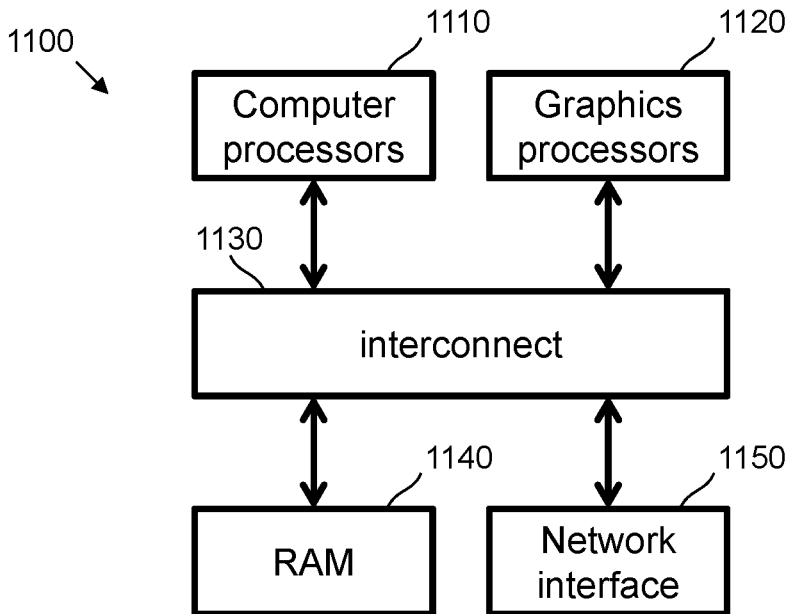
FIG. 11 is a schematic illustration showing an example computing device.

FIG. 11 shows an example server device 1100 that may implement server device 120 in FIG. 1 or may perform one or more of the methods of FIGS. 9B and 10. The server device may comprise a rack-mounted server blade multi-processor server system. It may comprise a multiplicity of network-connected computer processors that run software in parallel. The server device 1100 comprises a multicore cluster of computer processor (CPU) cores 1110 and a multicore cluster of graphics processor (GPU) cores 1120. The processors connect through a board-level interconnect 1130 to random-access memory (RAM) devices 1140 for program code and data storage. Server system 1100 also comprises a network interface 1150 to allow the processors to access the Internet. By executing instructions stored in RAM devices through interface 1130, the CPUs 1110 and GPUs 1120 may perform steps of methods as described herein. In certain cases, the client devices as described herein may have a similar general arrangement of compo-nents, but in certain cases may have fewer computing resources and may not have dedicated graphics processors 1120. A client device may have one or more CPUs that perform the steps of methods described herein in a similar manner to the server device 1100.

Configuring an Example System

Figure 12:
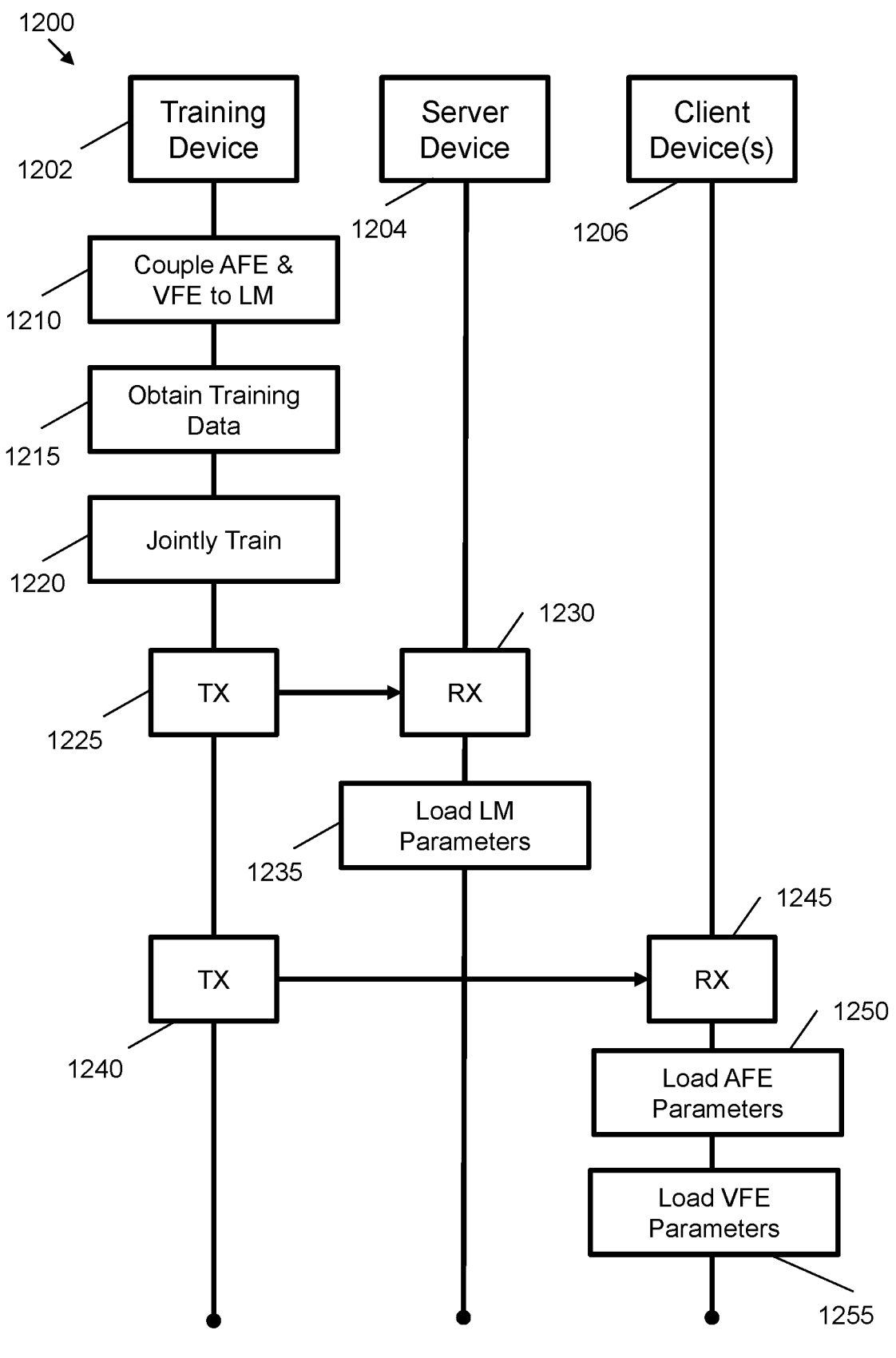
FIG. 12 is a sequence diagram showing communications between a set of computing devices while configuring a system for processing speech according to an example.

FIG. 12 is a sequence diagram showing an example set of operations 1200 for configuring a speech processing system. The set of operations 1200 may be seen as an extension of the method 1000 of FIG. 10. The set of operations 1200 take place across a distributed computing system comprising a training device 1202, a server device 1204 and a set of one or more client devices 1206. For example, the training device 1202 and/or the server device 1204 may comprise a computing system such as that shown in FIG. 11, and the client devices 1206 may comprise client devices such as those shown in FIGS. 1, 2, 3A and 3B.

Blocks 1210 to 1220 are performed at the training device 1202 and are similar to the operations of FIG. 10. At block 1210, an audio feature extractor and a visual feature extrac-tor are communicatively coupled to a linguistic model. This may comprise loading and instantiating model classes defined within computer program code that is loaded into memory and executed on one or more processors. In one case, this may comprise defining a coupling between the outputs of the audio feature extractor and the visual feature extractor and a corresponding input of the linguistic model. The coupling may be defined in computer program code and/or through a graphical development environment. At block 1215, training data is obtained. This may comprise loading one or more batches of training data from a database or one or more computer files. The training data comprises input for the audio feature extractor and the visual feature extractor and a corresponding ground-truth output for the linguistic model. The training data may comprise a triple made up of (audio_samples, video_frames, text_output) or (audio_samples, video_frames, phoneme_output). The training data may be used as-is or may be preprocessed. For example, a text or phoneme output may be split into a sequence of symbols such as phonemes, characters or words. If the audio samples comprise raw audio data they may be pre-processed as per a production audio processing pipeline prior to application of the audio feature extractor at the client device. Similarly, if the video frames comprise raw image data they may be pre-processed as per a production image processing pipeline prior to application of the visual feature extractor at the client device.

At block 1220, the combined system defined at block 1210 is jointly trained using the training data obtained at block 1215. This may comprise running a script and/or pre-defined training procedure that retrieves individual data samples from the training data, applies the input to the audio feature extractor and the visual feature extractor, and com-putes a loss function value based on a comparison of the output of the linguistic model and a ground truth value from the training data. In other cases, a variety of training approaches may be applied depending on the form of the combined system and the training data that is available, e.g., training may be supervised or unsupervised (e.g., the latter using clustering instead of ground-truth values). The output of the joint training at block 1220 comprises sets of trained parameters for each of the audio feature extractor, the visual feature extractor and the linguistic model, e.g., as shown in FIG. 7. These trained parameters may comprise values (e.g., integer or floating-point values) for one or more sets of weights and biases. In one case, the trained parameters may be defined as one or more tensors, e.g., one or more matrices (numeric arrays) or vectors. These may be stored in a configuration file.

At block 1225, the trained parameters for the linguistic model are communicated to the server device 1204. Although one server device is shown in this example, there may be multiple server devices in other examples, e.g., when implementing a load-balanced infrastructure with parallel server device implementations. At block 1230, the trained parameters are received at the server device 1204. The trained parameters may be communicated over a network, e.g., by transferring one or more configuration files using file transfer protocols, and/or transferred over a local intercon-nect (e.g., if the training device 1202 and the server device 1204 are co-located in a physical and/or virtual environ-ment). At block 1235, the trained parameters are loaded by the server device 1204 to instantiate the linguistic model. For example, this may comprise configuring a neural net-work architecture according to the values for one or more sets of weights and biases within the trained parameters. Block 1235 may be performed when the server device 1204 is activated to start processing data from the client devices 1206.

At block 1240, a similar process to blocks 1225 to 1235 is repeated for one or more client devices 1206. At block 1240, the trained values for the audio and visual feature extractors are communicated to the one or more client devices 1206. These need not occur for all client devices 1206 simultaneously, for example, the trained parameters may be embedded in computer program code and/or data that is communicated to the client devices in the form of a software update and/or that are downable by an agent running upon the client devices. At block 1245, the trained parameter values are received by the one or more client devices 1206. At block 1250, the trained parameters for the audio feature extractor are used to configure the audio feature extractor, e.g., values for one or more sets of weights and biases may be used to instantiate a recurrent neural network architecture. At block 1255, the trained parameters for the visual feature extractor are used to configure the visual feature extractor, e.g., values for one or more sets of weights and biases may be used to instantiate a convolu-tional neural network architecture. Following blocks 1250 and 1255, the client devices 1206 are ready to generate audio and visual feature tensors that for processing by the server device 1204, e.g., as per the operations of FIGS. 4A to 4C.

In FIG. 12, blocks 1225 to 1255 may be performed at a time of manufacture. In this case, the transmission at blocks 1225 or 1240 may comprise transmitting data over one or more coupled data interfaces (e.g., a Universal Serial Bus), e.g., within a factory environment.

In one case, at block 1030 in FIG. 10 or block 1220 in FIG. 12, one or more of the audio and visual feature tensors may be weighted during training, prior to input to the linguistic model. For example, in a similar manner to the "dropout" approach, input from the visual feature tensor may be zeroed (in whole or for a defined proportion of element within the tensor) for certain samples, and/or a certain randomly selected proportion of samples. This may help the linguistic model learn transformations that still produce a useable output in the case of an absent visual feature tensor. This may be useful in cases where image data is not available (e.g., a user may deactivate a camera and/or a camera may not be present or working).

In certain cases, block 1210 may comprise obtaining a trained visual classification model and removing one or more classification layers of the configured visual classification model to generate a new output layer for the trained visual classification model. For example, this may comprise obtaining a pre-built visual classification model and a set of trained parameters for the model. The visual classification model may be trained using public datasets such as ImageNet. Removing one or more classification layers may comprise removing one or more of a softmax layer used to output classification probabilities and late feed-forward and/or convolutional neural network stages. The classification layers may be removed by editing computer program code that defines the visual classification model, e.g., via a code editor and/or graphical development environment. Once the one or more classification layers are removed, block 1210 may further comprise communicatively coupling a further neural network architecture comprising one or more layers to the new output layer to obtain the visual feature extractor. In this case, the dimensionality of the output of the further neural network architecture is smaller than the dimensionality of the new output layer, i.e. the further neural network architecture acts to generate a compressed "code" for use as the visual feature tensor in a similar manner to an autoencoder.

Certain examples herein have been described with relation to neural network models. In other cases, one or more statistical models may be used, and/or a mix of neural network and statistical models. In examples where the linguistic model comprises a statistical model, jointly configuring the linguistic model may comprise loading probability values and/or frequency values for the linguistic model, e.g., in a similar manner to the weights and/or biases of neural network models.

Example Implementations

Certain examples are described that relate to speech processing including automatic speech recognition. Certain examples relate to the processing of certain spoken languages. Various examples operate, similarly, for other languages or combinations of languages. Certain examples improve an accuracy and a robustness of speech processing by incorporating extralinguistic environmental information. Extralinguistic environmental information may be used to improve linguistic models. Linguistic models may comprise one or more of acoustic models, pronunciation models and language models.

In certain examples, the extralinguistic environmental information comprises a visual representation of an environment, e.g., a representation derived from image data. In certain examples, the extralinguistic environmental information comprises an acoustic representation of an environment, e.g., a representation derived from audio data that may or may not represent an utterance to process. In the latter case, an acoustic representation of an environment may be provided in addition to an acoustic representation of the utterance. Certain examples may use correlations between visual and acoustic features to improve an accuracy of speech processing. For example, in an acoustic model, an image of a crowd of people may be correlated with a "babble" background noise whereas an image of an outdoor scene is likely to be correlated with wind noise. The "babble" noise and the wind noise may have different acoustic characteristics. A visual representation may thus enable an acoustic model to select a more "correct" noise representation, e.g., select a sequence of phonemes that is consistent with both the acoustic and visual representation. In certain cases, additional extralinguistic environmental information may also be used, such as date/time information or geolocation information. For example, geolocation information may increase a confidence of a classification of "outdoors" for acoustic modelling purposes. In certain cases, extralinguistic information may provide a particular improvement for start of sentence word statistics, e.g., for selecting a context that is used for transcription of a sequence, where divergent contexts may lead to divergent sequences.

Adding an acoustic representation to existing audio data may be useful as client devices such as mobile phones are often highly adapted to record voice data at the cost of a distorted acoustic representation of an environment. For example, noise cancellation on microphones improves perceived speech audio quality (e.g., for human playback) but discards useful information for machine processing. In examples such as the system 800 of FIG. 8, parallel audio pathways for voice and environmental representations enable a linguistic model to counteract negative effects of client device processing, such as noise cancellation and beam forming. In certain cases, an audio feature extractor may have a different neural network architecture to a linguistic model neural network architecture, e.g., to provide an acoustic representation of an environment convolutional neural networks may be used that may not be suitable for direct speech processing. In these cases, an audio feature tensor may be used to augment speech audio. Certain examples described herein jointly configure a model of features of environmental information and a linguistic model, where the features may be visual and/or acoustic.

Certain methods and sets of operations may be performed by instructions that are stored upon a non-transitory computer readable medium. The non-transitory computer readable medium stores code comprising instructions that, if executed by one or more computers, would cause the computer to perform steps of methods described herein. The non-transitory computer readable medium may comprise one or more of a rotating magnetic disk, a rotating optical disk, a flash random access memory (RAM) chip, and other mechanically moving or solid-stage storage media. Data centers commonly use magnetic disks and flash memory to store data and code comprising instructions for server processors. Mobile devices commonly use flash memory to store data and code for processors within system-on-chip devices. Any type of computer-readable medium is appropriate for storing code comprising instructions according to various example.

Certain examples described herein may be implemented as so-called system-on-chip (SoC) devices. SoC devices control many embedded systems and IoT devices, and may be used to implement the client device functions described herein. In one case, one or more of the visual feature extractor and the audio feature extractor may be implemented as a SoC device. An SoC device may comprise one or more processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. An SoC device may also comprise various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors of an SoC device may perform steps of methods as described herein.

Certain examples have been described herein and it will be noted that different combinations of different components from different examples may be possible. Salient features are presented to better explain examples, however, it is clear that certain features may be added, modified and/or omitted without modifying the functional aspects of these examples as described.

Various examples are methods that use the behavior of either or a combination of humans and machines. Method examples are complete wherever in the world most constituent steps occur. Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

What is claimed is:

1. A driver interface system comprising:
a camera interface enabled to capture images of a driver and an environment surrounding the driver;
an image processor enabled to extract, from captured images of the driver and an environment surrounding the driver, visual features, the visual features being an abstraction of the captured images, the abstraction being a compressed representation of the captured images;
a microphone interface enabled to capture speech;
a speech recognizer enabled to extract, from the captured speech, linguistic features;
a natural language processor enabled to infer a voice command from the linguistic features and the visual features; and
an output interface for rendering a response to the voice command; and wherein the speech recognizer uses a machine-learned linguistic model based on a combination of audio feature tensors and visual feature tensors.

2. The driver interface system of claim 1 wherein inferring the voice command from the linguistic features and the visual features is configured by a set of acoustic model configurations parameters.

3. The driver interface system of claim 1 further comprising a data interface enabled to transmit visual features and captured speech to a server, wherein the speech recognizer extracts linguistic features by making an application programming interface (API) call to the server through the data interface.

4. The driver interface system of claim 3 wherein the data interface is a wireless network interface.

5. The driver interface system of claim 1 further comprising a data interface enabled to transmit visual features and captured speech to a server, wherein the natural language processor infers the voice command by making an application programming interface (API) call to the server through the data interface.

6. The driver interface system of claim 5 wherein the data interface is a wireless network interface.

7. The driver interface system of claim 1 wherein the visual features indicate a gesture.

8. The driver interface system of claim 1 wherein the response is rendered by projection onto a display screen.

9. A driver interface system comprising:
a camera interface enabled to capture images of a driver and an environment surrounding the driver;
a neural network image processor enabled to extract, from captured images of the driver and an environment surrounding the driver, visual features, the visual features being an abstraction of the captured images determined by the neural network image processor, the abstraction being a compressed representation of the captured images with reduced information content as compared to the captured images;
a microphone interface enabled to capture speech;
a speech recognizer enabled to extract, from the captured speech, linguistic features; and
a natural language processor enabled to infer a voice command from the linguistic features and the visual features, including visual features absracted from an environment surrounding the driver;
wherein the image processor, the speech recognizer, and the natural language processor are jointly configured by joint training, such that the extraction of the visual feature tensors and audio feature tensors is optimized in combination with the natural language processor to minimize errors in inferring the voice command.

10. The driver interface system of claim 9 wherein inferring the voice command from the linguistic features and the visual features is configured by a set of acoustic model configurations parameters.

11. The driver interface system of claim 9 further comprising a data interface enabled to transmit visual features and captured speech to a server, wherein the speech recognizer extracts linguistic features by making an application programming interface (API) call to the server through the data interface.

12. The driver interface system of claim 11 wherein the data interface is a wireless network interface.

13. The driver interface system of claim 9 further comprising a data interface enabled to transmit visual features and captured speech to a server, wherein the natural language processor infers the voice command by making an application programming interface (API) call to the server through the data interface.

14. The driver interface system of claim 13 wherein the data interface is a wireless network interface.

15. The driver interface system of claim 9 wherein the speech recognizer uses a machine-learned linguistic model based on a combination of audio feature tensors and visual feature tensors.

16. The driver interface system of claim 9 wherein the visual features indicate a gesture.

17. The driver interface system of claim 9 further comprising an output interface for rendering a response to the voice command.

18. The driver interface system of claim 17 wherein the response is rendered by projection onto a display screen.

19. A driver interface system comprising:

a camera interface enabled to capture images of a driver and an environment surrounding the driver;

an image processor enabled to extract, from captured images of the driver and an environment surrounding the driver, visual feature tensors, the visual feature tensors being an abstraction of the captured images, the abstraction being a compressed representation of the captured images with reduced information content as compared to the captured images;

a microphone interface enabled to capture speech;

a speech recognizer enabled to extract, from the captured speech, audio feature tensors;

a natural language processor enabled to concatonate or merge the visual feature vectors and audio feature vectors to infer a voice command;

wherein the image processor, the speech recognizer, and the natural language processor are jointly configured by joint training, such that the extraction of the visual feature tensors and audio feature tensors is optimized in combination with the natural language processor to minimize errors in inferring the voice command; and an output interface for rendering a response to the voice command.

* * * * *